(12) United States Patent
Shibukawa et al.

(10) Patent No.: US 7,133,206 B2
(45) Date of Patent: Nov. 7, 2006

(54) REFLECTING SURFACE MATERIAL

(75) Inventors: Toshiya Shibukawa, Zushi (JP);
Hiroaki Harata, Yokohama (JP);
Hiroki Nagayama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/167,069

(22) Filed: Jun. 24, 2005

(65) Prior Publication Data
US 2006/0006685 A1    Jan. 12, 2006

(30) Foreign Application Priority Data
Jun. 28, 2004    (JP) ............... 2004-190338

(51) Int. Cl.
*G00B 27/10* (2006.01)
*G02B 5/124* (2006.01)

(52) U.S. Cl. .................. 359/627; 359/530

(58) Field of Classification Search ........ 359/529–531, 359/627
See application file for complete search history.

(56) References Cited
FOREIGN PATENT DOCUMENTS

| EP | 1 179 628 A1 | | 2/2002 |
|---|---|---|---|
| JP | 2-028842 | * | 6/1990 |
| JP | 06-227250 | | 8/1994 |
| JP | 2001-122044 | | 5/2001 |

* cited by examiner

*Primary Examiner*—Alicia M Harrington
(74) *Attorney, Agent, or Firm*—Global IP Counselors

(57) ABSTRACT

A reflecting surface material for a vehicle interior, including multiple units of reflecting material each having a surface defined by a concave cross-sectional profile with at least one light reflecting face formed in one sector of the profile and at least one light absorbing face formed in another sector of the profile. A plurality of units of reflecting material are positioned such that the light reflecting faces are disposed in one direction toward the exterior of the vehicle and the light absorbing faces are disposed in another direction toward the driver of the vehicle.

18 Claims, 23 Drawing Sheets

(A)

(B)

(A)

(B)

(C)

(A)

(B)

(A)

(B)

(A)

(B)

(A)

(B)

(C)

(A)

(B)

(A)

(B)

(A)

(B)

(A)

(B)

REFLECTING SURFACE MATERIAL

This application claims the benefit of Japanese Application No. 2004-190338, filed Jun. 28, 2004, the entirety of which is incorporated herein by reference.

FIELD OF THE INVENTION

This invention concerns material for reducing the feeling of heat in summer and providing a comfortable temperature environment, more particularly, it concerns a suitable reflecting surface material to be used for the purpose of reducing the elevation of temperatures of interiors of automobiles.

BACKGROUND OF THE INVENTION

With respect to the material used for vehicle interiors, single layer construction resin sheets made with polyvinyl chloride or thermoplastic polyolefin resins (TPO) are frequently used for surface materials for instrument panels/dashboards. The brightness of the resin sheets is low (60 or less) to prevent reflection on the windshield. The surface of an instrument panel/dashboard, which has resin sheets like these, absorbs the incoming rays of the sun which come in through the windshield and becomes very hot.

It is well known that the interior of a parked automobile gets very hot in the blazing sun. According to measurement of the temperature of automobile interiors in the summer in Japan, the temperature inside automobiles parked in the sun reaches approximately 70° C. As for the materials used in the interior, it is reported that the top of dashboards reach about 100° C. while the surface of the ceiling materials and the surface of seats reach high temperatures of around 70° C. Needless to say riding in a vehicle under these circumstances is unpleasant and not only does the passenger feel uncomfortable because the heat is radiated for a long time from the materials used in the interior of the vehicle, the seat feels hot to the passenger due to thermal conductivity from the heat accumulated in the surface of the seat. In addition, the temperature inside of the vehicle and the temperature of the materials used in the interior of the vehicle do not go down readily with ventilation or from air conditioning so that excessive consumption of energy due to air conditioning becomes a problem.

Hitherto, interior material surfaces have been made to include infrared ray reflecting pigments and technology which reflects infrared rays has been proposed concerning problems like these of parked cars in the sun for the purpose of preventing excessive heating of the surfaces of interior materials. See Japanese Unexamined Patent Application Publication No. 2001-114149 (EP 1 179 628 A1) and Japanese Unexamined Patent Application Publication No. 2001-122044.

However, with these technologies, the direction of reflection becomes irregular and most of the reflected light rays are absorbed in the resin layer and are converted to heat because the infrared reflecting pigment powder is mixed into the resin randomly. Moreover, approximately half of the energy of the sun's rays is visible light and in addition to that, the major cause of rising temperatures of the surface of vehicle interiors has been visible light because the window glass used in automobiles in recent years has been predominantly thermally insulated glass which absorbs near infrared. Thus, a significant effect in preventing the excessive heating of surfaces of automobile interiors cannot be expected from interior facing materials which reflect infrared rays.

Likewise, an optical reflecting feature has been tried on a vehicle other than reflection by surfaces of interior materials. Specifically, a technology is known which concerns multi-layered glass for vehicles which adds a reflecting feature to the glass of windows so that ultra-violet rays are prevented from entering the interior of a vehicle. See Japanese Patent No. 3315453.

However, windshield and front and side windows must have a visible light transmission rate (Tv) of at least 70% according to most laws. In order to maintain this standard, a reflecting feature can only have a sunlight reflection rate (Re) of 20 to 30% and one cannot hope for an increase in performance beyond this. As pathways of entry for light, the windshield and front and side windows have a large area and the fact that no more can be done with these windows for measures of keeping temperatures down means that it is necessary to devise other measures for controlling temperatures. Incidentally, the values of sunlight reflection rate (Re), sunlight transmission rate (Te), visible light reflection rate (Rv) and visible light transmission rate (Tv) cited earlier are measured according to Japan Industrial Standard (JIS) R3106.

Measures for controlling temperatures by means other than mentioned above might include methods of increasing the rate of reflection or the brightness of the surface interior materials and reflecting the energy of the sun's rays for the purpose of preventing excessive heating of the surfaces of interior materials. However, merely raising the rate of reflection of visible light (Rv) of the surface of interior materials would radiate it towards other parts of the interior and ultimately would result in an increase in temperatures inside a vehicle as before. In addition, there is a concern that due to the angle of the reflected sunlight, the reflected light would get into the driver's eyes, or the interior materials would be reflected in the glass of the windows causing a glare that would obstruct the driver's field of vision. Thus, raising the rate of reflection and suppressing window reflection and glare for the driver are in a paradoxical relationship so that the achievement of materials and configuration which prevent window reflection and driver glare without diminution of the reflecting feature is required.

SUMMARY OF THE INVENTION

The inventors, with respect to the previously described problem devised a method which, in interior materials for vehicles, on the one hand uses reflecting material and on the other hand causes light reflective surfaces to function in the direction of incoming sun rays so that the light reflective surfaces are not directly visible to the driver and are not visible to the driver reflected in the window glass. This invention was devised from this standpoint.

Thus, the purpose of this invention is to provide reflecting surface materials, which can be suitably applied to interior surfaces of vehicles, which effectively reflects the energy of sunlight including visible light and can restrict the rise in the surface temperatures of vehicle interior materials from direct sunlight or sunlight passing through glass.

The present invention for achieving the previously stated purpose has a surface which has a concave cross-sectional profile with light reflecting faces formed in one sector and light absorbing faces formed in another sector in the surface of the reflecting material. The reflecting material is placed disposing the light reflecting faces in one direction and disposing the light absorbing faces in another direction.

With a reflecting surface material of this invention, the rays of the sun shining on reflecting material will be reflected in one direction by light reflecting faces and will not be reflected in other directions because the light reflecting faces of the reflecting material face one direction. Consequently, since most of the heat of the rays of the sun shining on the reflecting material are caused to be returned in one direction, the temperature of the reflecting material itself as well as the temperatures of the atmosphere and items which exist in the other direction do not rise. Likewise if a person views the reflecting material from a direction other than that one direction, the rays of the sun reflected by the reflecting material will not get in the eyes of that person. Thus, that person will not sense a glare.

In addition, since the light absorbing faces of each unit of the reflecting material face in another direction, the rays of the sun reflected by the light reflecting faces strike the light absorbing faces and are absorbed by these light absorbing faces, and rays of the sun which directly strike these light absorbing faces are also absorbed by these light absorbing faces. Thus, if a person views the reflecting material from another direction the rays of the sun will not get in the eyes of that person or will be considerably weakened. Thus, that person will not sense a glare.

The reflecting surface materials can be suitably applied to interior materials of vehicles and can effectively reflect the energy of sunlight including visible light and can restrict the rise in the surface temperatures of vehicle interior materials from direct sunlight or sunlight passing through glass.

BRIEF DESCRIPTION OF THE DRAWINGS

For fully understanding the nature and objects of the invention, reference should be made to the following detailed description of a preferred mode of practicing the invention, read in connection with the accompanying drawings in which:

FIG. 14(A) shows the circumstances when the undesirable situation arises that the rays of the sun reflected by the smooth reflecting material on the top of the instrument panel/dashboard enter the eyes of the driver and the driver feels a glare. FIG. 14(B) shows the circumstances when the undesirable situation arises that the view outside the vehicle is reflected by the smooth reflecting material on the top of the instrument panel/dashboard and is again reflected by the windshield and is seen by the driver. FIG. 14(C) shows the circumstances when the undesirable situation arises that the rays of the sun reflected by the smooth reflecting material on the top of the instrument panel/dashboard heat up the interior such as the ceiling of the cabin.

DETAILED DESCRIPTION OF THE INVENTION

Several embodiments of the invention will be explained below with reference to the drawings.

The Reflecting Facing Material 10

Figure 1:
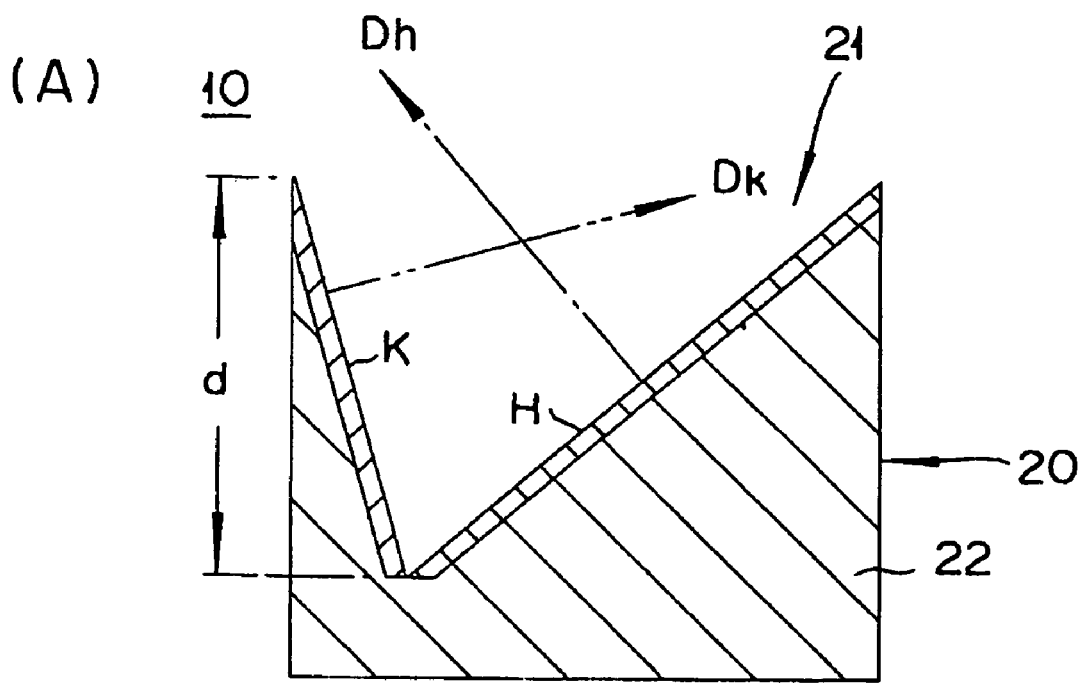
FIG. 1(A) is a cross-sectional view showing a blown up view of the unit reflecting material in the reflecting material of this invention.
FIG. 1(B) is a perspective view showing multiple units of reflecting material arrayed/lined up without a gap.
Figure 1:
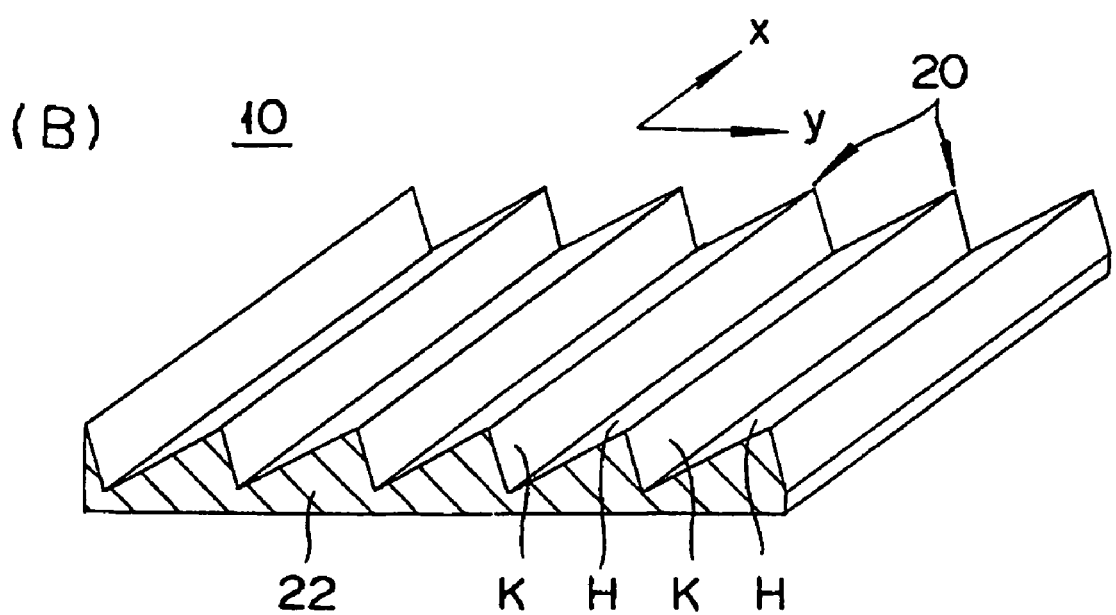
Figure 2:
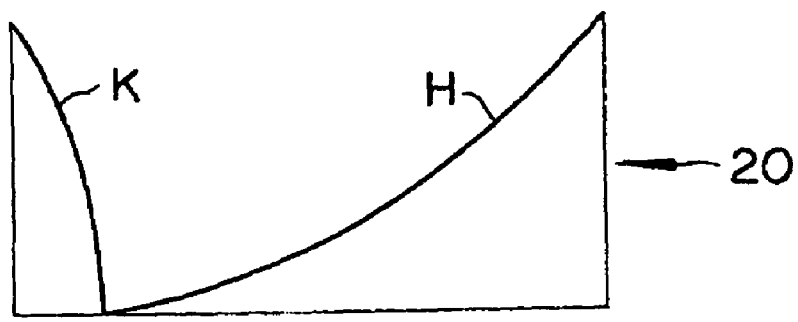
FIGS. 2(A) through (C) are cross-sectional views showing another example of configuration of the unit reflecting material in the reflecting material of this invention.
Figure 2:
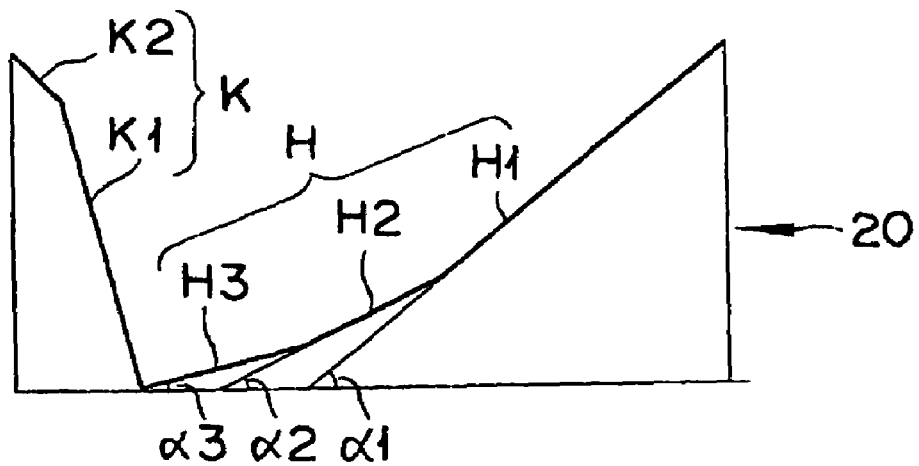
Figure 2:
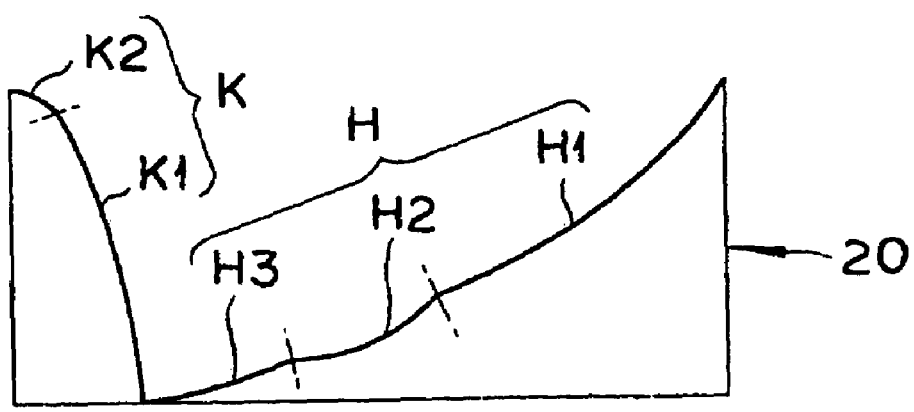
Figure 3:
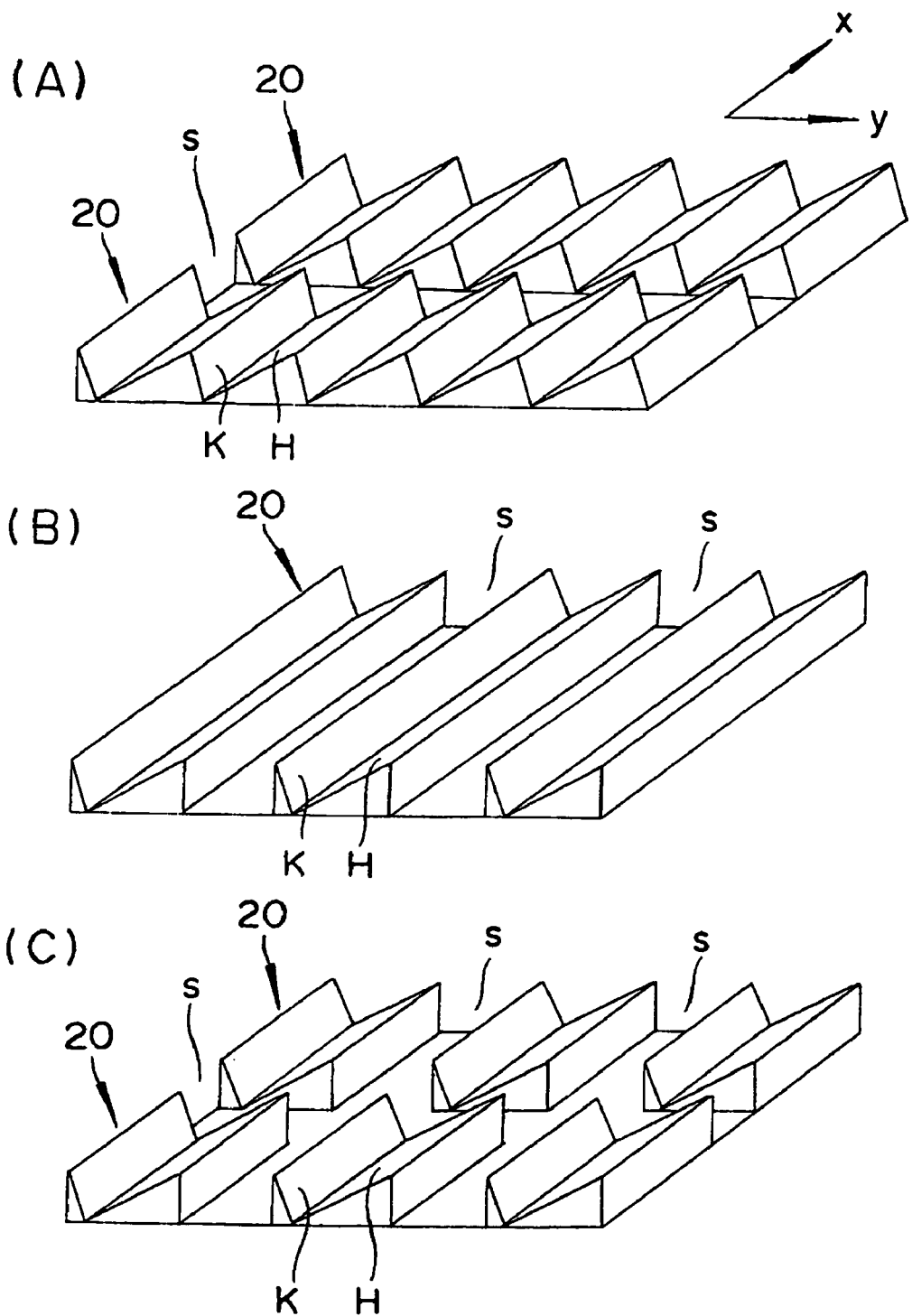
FIGS. 3(A) through (C) are perspective views showing multiple units of reflecting material arrayed/lined up separated by gaps.
Figure 4:
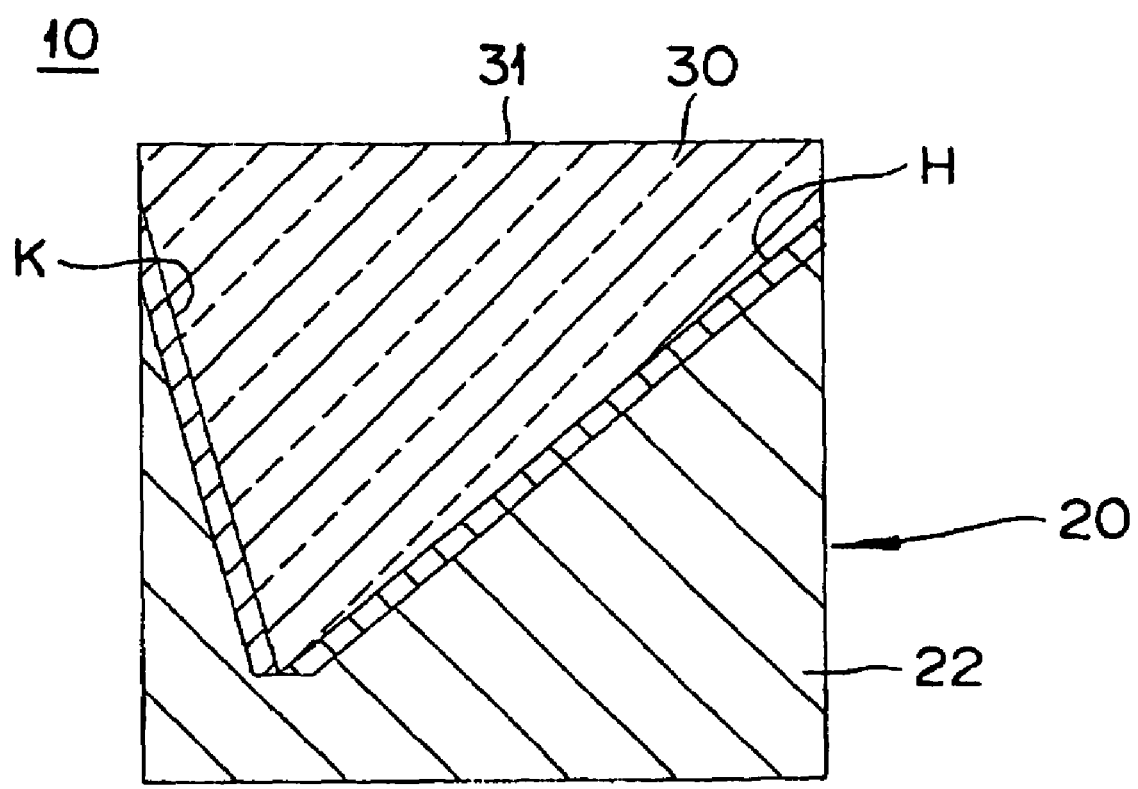
FIG. 4 is a cross-sectional view showing a reflecting material having a flat outermost layer.

FIG. 1(A) is a cross-sectional showing a blown up view of the unit reflecting material 20 in the reflecting facing material 10 of this invention. FIG. 1(B) is an oblique view drawing showing multiple units of reflecting material 20 arrayed/lined up without a gap. FIG. 2(A) through (C) are cross-sectional drawings showing different configurations of unit reflecting material 20 in the reflecting facing material 10 of this invention. FIG. 3(A) through (C) are oblique view drawings showing multiple units of reflecting material 20 arrayed/lined up separated by gaps. FIG. 4 is a cross-sectional drawing showing a reflecting facing material 10 having a flat outermost layer 31.

Referring to FIGS. 1(A) and (B), reflecting facing material 10 of this invention has multiple unit reflecting material 20 formed with surface 21 having a concave cross-sectional profile. Light reflecting face H forms one sector of surface 21 of unit reflecting material 20 and light absorbing face K forms the other sector of surface 21. Multiple units of reflecting material 20 are arrayed such that the respective light reflecting faces H face one direction, Dh, while the respective light absorbing faces K face another direction, Dk.

Surface 21, has a concave cross-sectional profile, is formed by metal molding resin material which becomes substrate 22.

In this specification "light reflecting face H" is defined as a face that has the property of reflecting the sun's rays as its chief property. "Light absorbing face K" has the property of absorbing the sun's rays as its chief property. For light reflecting face H it is necessary that its total reflection rate be high and in particular it is desirable that its regular reflection rate be high. This will make it easy to limit the direction which the sun's rays are caused to be reflected to a specific direction. For light absorbing face K it is necessary that the total rate of reflection be low and there is no problem if the diffuse rate of reflection is high. That is because since the total rate of reflection is essentially low it will not release energy sufficient to raise the temperature of the atmosphere or items which exist in the direction that the sun's rays are reflected even if the proportion of diffused reflected light is high. On the contrary, by raising the proportion which is diffused reflected light, the glare sensed by the person viewing light absorbing face K can be reduced. Consequently, the person viewing light absorbing face K does not sense a glare. Raising the diffuse rate of reflection while maintaining the regular rate of reflection can raise the upper limit value for total rate of reflection of light absorbing face K. When forming light absorbing face K the freedom of selection of methods and materials for forming light absorbing face K increases by the relaxation of the upper limit value for total rate of reflection. Light reflecting face H and light absorbing face K may also have adiabatic properties and good thermal transmission properties besides having properties which reflect/absorb the rays of the sun. Having adiabatic properties prevents the accumulation of heat in reflecting facing material 10 and can restrict the rise in surface temperature of reflecting facing material 10. Likewise, having good thermal transmission properties efficiently thermally transmits the heat of reflecting material 10 itself or the heat of the atmosphere touching reflecting material 10 to parts thermally connected to this reflecting material 10 and can cause it be released by these parts.

"One direction Dh" refers to the direction that the regular reflected light and diffuse reflected light reflected by light reflecting face H face, and has a breadth of a certain degree. As the rays of the sun are also reflected to a certain degree by light absorbing face K "another direction Dk" refers to the direction that regular reflected light and diffuse reflected light reflected by light absorbing face K face, and has a breadth of a certain degree. In addition, the angle made by one direction Dh and another direction Dk may be either an acute angle, a right angle or an obtuse angle.

"One sector" and "another sector," are suitably selected and determined for the optical properties required in the reflecting material 10, that is to say the property that requires that the rays of the sun be reflected, should face one sector Dh and the property that requires that the rays of the sun not be reflected should face another sector Dk. There are circumstances when the area of one sector of the surface 21 which has a concave cross-sectional profile is greater than the area of another sector, and conversely when the area of another sector is greater than the area of one sector or when the area of one sector is equal to the area of another sector. Further, there may be in surface 21, which has a concave cross-sectional profile, sectors in which neither light reflecting face H nor light absorbing face K are formed, that is to say sectors may exist which do not belong to either one sector or another sector. In this case surface 21 which has a concave cross-sectional profile will have a sector with substrate 22 exposed. Even with this configuration it can satisfactorily exhibit the optical properties mentioned above.

With the reflecting material 10, the rays of the sun shining on reflecting material 10 will be reflected in one direction, Dh, by light reflecting faces H and will not be reflected in other directions because the light reflecting faces H in reflecting material 10 are facing in one direction, Dh. Consequently, since most of the heat of the rays of the sun shining on reflecting material 10 will be returned in one direction, Dh, the temperature of reflecting material 10 itself, as well as the temperatures of the atmosphere and items which exist in other direction Dk, will not rise. Likewise if a person views reflecting material 10 from a direction other than one direction, Dh, the rays of the sun reflected by reflecting material 10 do not enter the eyes of that person. Thus, that person will not sense a glare.

In addition, since light absorbing faces K of reflecting material 20 are facing in the other direction, Dk, the rays of the sun reflected by light reflecting faces H strike and are absorbed by light absorbing faces K as are the rays of the sun which directly strike light absorbing faces K. Thus, if a person views reflecting facing material 10 from another direction, Dk, the rays of the sun will either not enter the eyes of that person or be considerably weakened. Thus, that person will not sense a glare.

Light reflecting face H is preferably formed as a plane (FIG. 1(A)). Light reflecting face H is not limited to being a plane and may also be formed as a curved surface to the extent that it exhibits the feature of reflecting the sun's rays (FIG. 2(A)). Moreover, planes and curved surfaces may be used together.

Light absorbing face K is preferably formed as a plane (see FIG. 1(A)). Light absorbing face K is not limited to being a plane and may also be formed as a curved surface to the extent that it exhibits the feature of absorbing the sun's rays (see FIG. 2(A)). Moreover, planes and curved surfaces may be used together.

The number of planes configuring light reflecting face H and or light absorbing face K is not limited to 1. Light reflecting face H may contain multiple planes H1, H2 and H3 whose angles of inclination $\propto 1$, $\propto 2$ and $\propto 3$ differ. (See FIG. 2(B)). Similarly, light absorbing face K may contain multiple planes K1 and K2 whose angles of inclination differ (See FIG. 2(B)).

The number of curved surfaces configuring light reflecting face H and or light absorbing face K is not limited to 1. Light reflecting face H may contain multiple curved faces H1, H2 and H3 whose angles of inclination $\propto 1$, $\propto 2$ and $\propto 3$ differ. (See FIG. 2(C)). Similarly, light absorbing face K may contain multiple planes K1 and K2 whose radii of curvature differ (See FIG. 2(C)).

Referring to FIG. 1(B), multiple units of reflecting material 20 are arrayed without a gap in x axis and y axis directions in the drawing.

As shown in FIGS. 3(A) through (C), multiple units of reflecting material 20 are arrayed, separated by gaps s. In FIG. 3(A) multiple units of reflecting material 20 are shown arrayed in the direction of axis x separated by gaps s and arrayed in the direction of axis y without any gaps. In FIG. 3(B) multiple units of reflecting material 20 are shown arrayed in the direction of axis y separated by gaps s and arrayed in the direction of axis x without any gaps. In FIG. 3(C) multiple units of reflecting material 20 are arrayed in both the x axis direction and the y axis direction separated by gaps s.

The total rate of reflection of sunlight of light reflecting face H should preferably be at least 50%. That is because it will effectively reflect the solar energy containing visible light and can curb the rise in surface temperature of such things as interior materials due to direct sunlight or sunlight that has passed through glass.

The total rate of reflection of sunlight of light absorbing face K should preferably be no more than 15%. That is because there will be no glare sensed when reflecting material 10 is viewed from the previously mentioned other direction Dk.

The depth d of surface 21 which has a concave cross-sectional profile (See FIG. 1(A)) may have suitable dimensions but should preferably be 50 μm to 1000 μm. That is because the feel of reflecting material 10 becomes rough and is irritating if the depth of surface 21 exceeds 1000 μm. That is also because there is concern that a minimal force would destroy the structure of unit reflecting material 20 if the depth of surface 21 was not at least 50 μm. Thus, by making the depth of surface 21 which has a concave cross-sectional profile between 50 μm and 1000 μm it will not feel rough and the structure of unit reflecting material 20 can be maintained.

Light reflecting face H is formed from either a vapor deposition type reflecting film, metallic plating film or reflective paint film. In a vapor deposition type reflecting layer or vapor deposition reflective film, interference reflecting films can be used. A vapor deposition of a reflecting film refers to a process in which a metal is vapor deposited on a resin film comprising a thermoplastic resin and made to have a reflecting feature. Common metals, including aluminum, silver, lead, copper, chromium, nickel, titanium and oxides of these metals, may be used as the metal forming this reflecting film. Likewise, these metals may have other additives added to them and have improved optical, chemical and mechanical properties. By vapor depositing these metals and metallic oxides on resin film, a reflecting film with the desired heat reflecting performance can be obtained. Vapor deposition of the metal on the resin film is accomplished using either the surface vacuum deposition method, sputtering method or ion plating method. The thickness of the vapor deposited reflecting film can be varied in order to impart the desired reflecting performance. Film type materials are generally used in interference reflecting materials configuring interference reflecting films. Likewise, paints using aluminum pigments are used to form reflective paint film.

When applying reflecting material 10 to the materials used in the interiors of vehicles, light absorbing face K should not have any glare or reflection when viewed directly or from the reflection in the glass of a window. When using a black resin for the substrate of reflecting material 10, light absorbing face K can be easily formed by exposing this black resin. For example, an aluminum vapor deposited film is formed over an entire black thermoplastic resin sheet and surface 21 which has a concave cross-sectional profile is formed in reflecting material 20 by metal pattern press molding. At this time light reflecting face H comprising vapor deposited aluminum film is formed in one sector of surface 21, which has a concave cross-sectional profile, and in the other sector of the surface 21 the vapor deposited aluminum film is exfoliated, exposing the black resin substrate forming light absorbing face K.

Reflecting material 10 may be formed on a sheet of resin containing multiple units of reflecting material 20 or formed directly on a substrate of molded resin.

The sheet of resin or the substrate of molded resin is either polyvinyl chloride resin, thermoplastic olefin resin, acrylic resin, polypropylene resin or polyester resin.

Referring to FIG. 4, reflecting material 10 may also be covered with transparent material 30, which allows light through and forms a flat outermost surface 31. Transparent material 30 is formed by coating the units of reflecting material 20 with a resin which allows light through. Resins used for this are polyvinyl chloride resin, thermoplastic olefin resin, acrylic resin, polypropylene resin or polyester resin.

As stated earlier, the feel of reflecting material 10 becomes rough and is irritating if the depth of surface 21 exceeds 1000 μm, but it is possible to make it feel smooth by coating reflecting material 10 with transparent material 30 to form a flat outermost surface 31. Also it is preferable to make the surface of the reflecting material 10 as flat as possible from the standpoint of maintenance such as keeping it dust free, etc. In addition, the concern that a minimal force will destroy the structure of reflecting material 10 if the depth of surface 21 was not at least 50 μm, is minimized by covering reflecting material 10 with transparent material 30.

Of course reflecting material 10 may be covered with transparent material 30 and have flat outermost surface 31 even when the depth d of surface 21, which has a concave cross-sectional profile, is between 50 μm and 1000 μm. Covering reflecting material 10 with transparent material 30 improves the feeling of reflecting material 10 and strengthens it in order to make destruction of the units of reflecting material 20 more difficult.

Interior Materials for Vehicles 40 Which Use Reflecting Material 10

Figure 5:
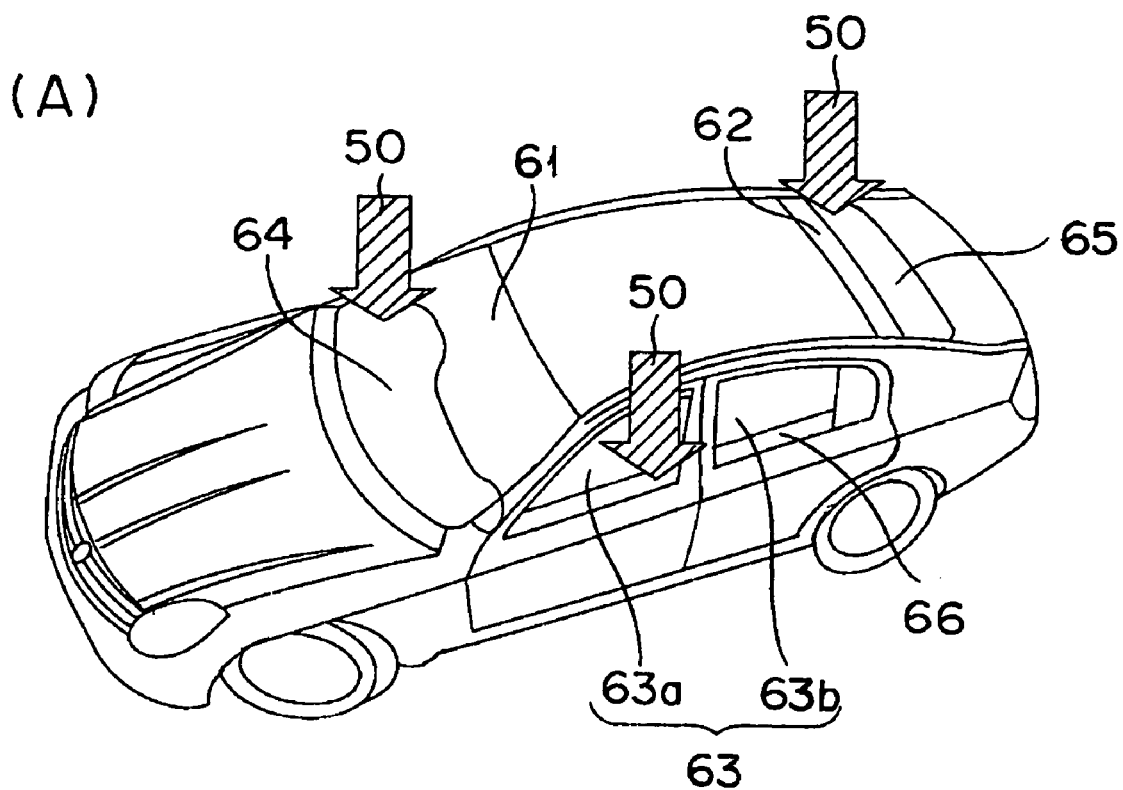
FIG. 5(A) shows the circumstances of the sun's rays irradiating the interior parts of a vehicle through window glass.
FIG. 5(B) shows the circumstances of the sun's rays irradiating the instrument panel/dashboard in a vehicle through a windshield.
Figure 5:
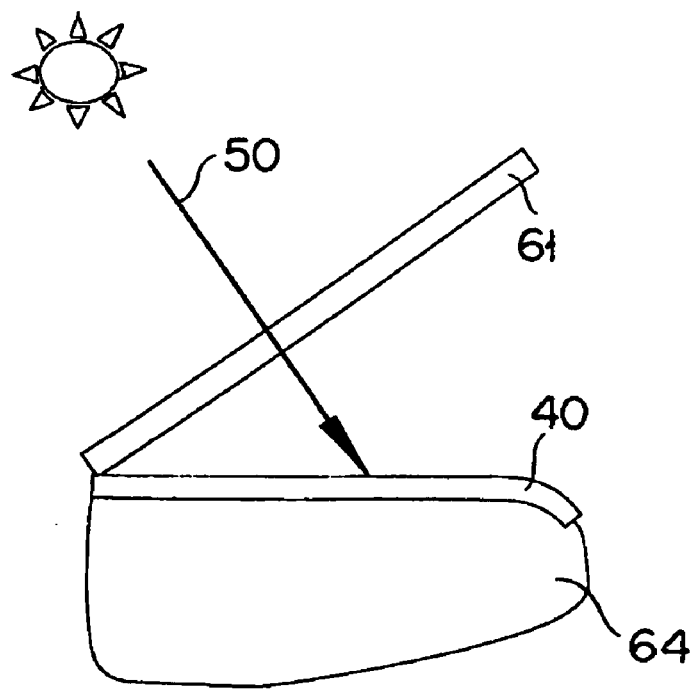

FIG. 5(A) shows the circumstances of the sun's rays 50 irradiating the interior parts of a vehicle through window glass. FIG. 5(B) shows the sun's rays 50 irradiating instrument panel/dashboard 64 through a windshield. As shown in FIG. 5(b), the surface of the instrument panel/dashboard 64 comprises the interior material for vehicles 40 of the present invention.

Figure 6:
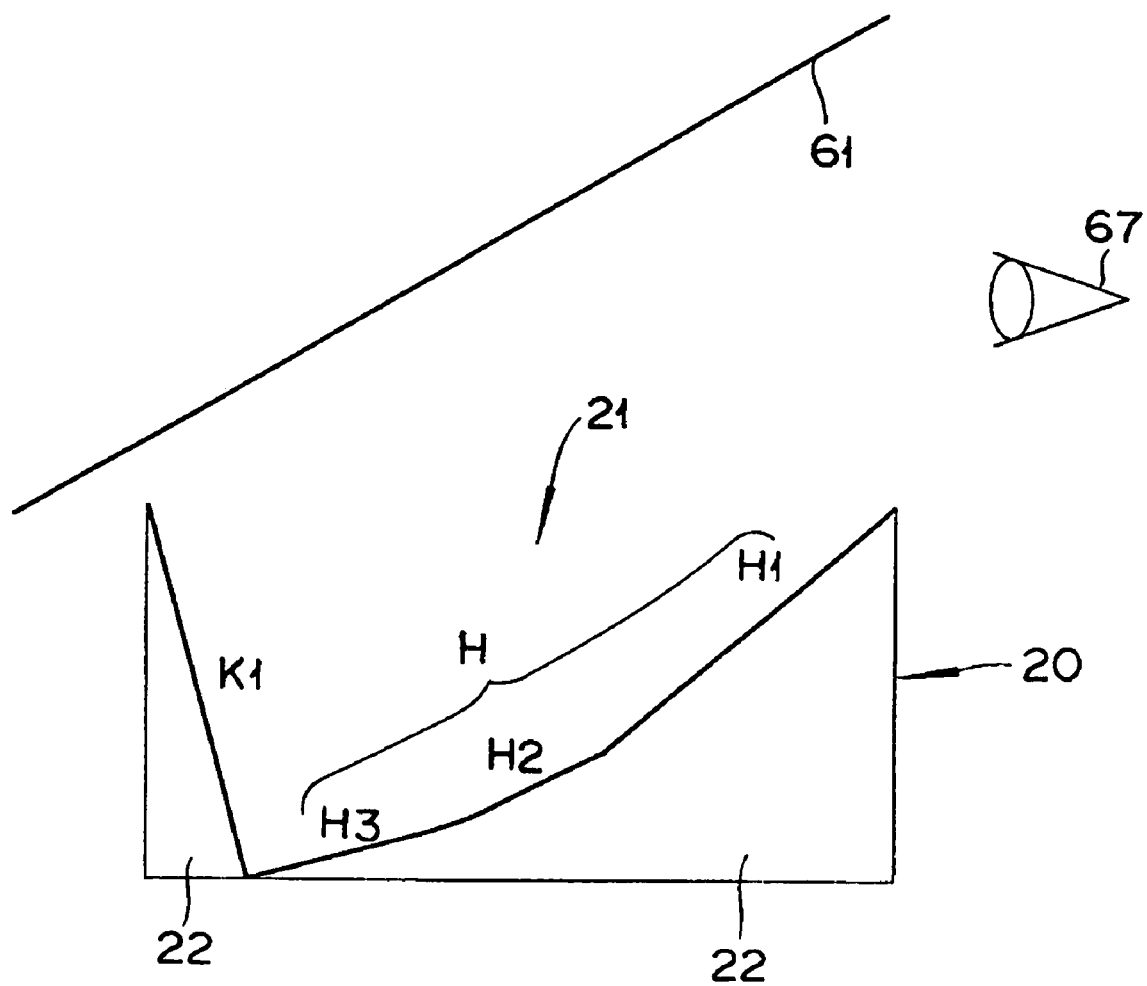
FIG. 6 is a blown-up view of a unit reflecting material of an example of an application of the vehicle interior material of this invention to the instrument panel/dashboard which is one part of the interior of a vehicle.

FIG. 6 shows a blown-up view of a unit reflecting material 20 of an example of an application of the vehicle interior material of this invention to the instrument panel/dashboard 64 which is one part of the interior of a vehicle.

As FIGS. 5(A) and (B) illustrate, in an automobile, the rays of the sun 50 penetrate to the interior of the vehicle through window glass and shine on the interior surfaces. The interior surfaces are heated and the temperature of the interior of the vehicle rises due to the radiation of the sunlight. Window glass includes the glass of the windshield 61, the rear window 62 and the windows on the side 63 (i.e., the front side windows 63a and the rear side windows 63b). Interior surfaces include, for example, the instrument panel/dashboard 64, the shelf behind the rear seat below the rear window 65 and the door weather stripping and door trim 66.

As for the previously mentioned reflecting material 10, since light reflecting faces H of unit reflecting material 20 are facing one direction, Dh, and light absorbing faces K are facing another direction, Dk, if reflecting material 10 is applied to the vehicle interior materials 40 the rays of the sun 50 shining on the vehicle's interior surfaces are reflected in one direction, Dh, by light reflecting face H and do not reflect light on other interior surfaces.

When applying the vehicle interior materials of this invention 40 to at least one type of interior surface, choosing from instrument panel/dashboard 64, door trim 66, or the shelf behind the rear seat below the rear window 65, the one direction, Dh, should face outside the vehicle and the other direction, Dk, should face inside the vehicle.

FIG. 5(B) and FIG. 6 show examples where vehicle interior material 40 of the present invention is applied to the instrument panel/dashboard 64. In this case, with respect to the interior material for vehicles 40, on the top of the instrument panel/dashboard 64 light reflecting face H is facing windshield 61 and light absorbing face K1 is facing the driver. More specifically, in this example, light reflecting face H and light absorbing face K are formed as flat planes. As shown in FIG. 6, light reflecting face H can contain multiple planes (3) with different angles of inclination, H1, H2, and H3. The three light reflecting faces H1, H2 and H3 face outside the vehicle relative to the windshield 61. Light absorbing face K1 faces inside the vehicle relative to the driver.

Multiple units of reflecting material 20 of reflecting material 10 which are equal to the length of the instrument panel/dashboard 64 can be used. Or the length of the reflecting material 10 may be shorter than the length of the instrument panel/dashboard 64 and multiple units of reflecting material 20 may be arrayed along the width direction of the vehicle.

Interior surface components such as the instrument panel/dashboard 64, the shelf behind the rear seat below the rear window 65 and door trim 65 are interior components which are directly exposed to the sun's rays and absorb the heat from the sunlight. Thus using interior surface material for vehicles 40 in at least one of the interior components noted above is extremely effective for solving the problem of trying to restrict the rise in temperature in a vehicle interior when it is parked in scorching sunlight.

In particular, the instrument panel/dashboard 64 and the shelf behind the rear seat below the rear window 65, which have large surface areas and are disposed near the glass of windshield 61 and rear window 62, respectively, are components which receive much incoming solar radiation in comparison to other interior components. Thus, by using interior surface material for vehicles 40 on instrument panel/dashboard 64 and the shelf behind the rear seat below the rear window 65, it is possible to significantly lower the interior temperature. The interior surface material for vehicles 40 of this invention is effective when applied to interior components that are disposed at an angle near window glass, and is also something that can be broadly applied to other interior components such as seats, steering wheels and center consoles.

By using reflecting material 10 in the facing layer of interior surface material for vehicles 40, solar radiation entering the interior of a vehicle is reflected toward the exterior of the vehicle without heating interior components which have had the material applied. Not only are the interior furnishing components which have had the material applied themselves not heated, because the solar radiation is being reflected outside the vehicle the interior components which have not had the material applied are not heated as well. Thus, it effectively reflects solar energy including visible light and restricts the rise in the surface temperature of interior materials from direct sunlight or sunlight that has passed through the glass.

The facing layer refers to the layer that comes on the surface of the interior surface material for vehicles 40 and indicates the layer disposed on the face upon which sunlight falls when sunlight falls on the interior furnishing component.

Interior surface material for vehicles 40 may be suitably applied to various model types such as sedans, compact cars, mini-vans and station wagons. It will also demonstrate a satisfactory effect with other vehicles as small automobiles, coupes, SUV's, 1 box types, 2 box types, vans and trucks.

Next the operation of the interior surface material for vehicles 40 of this invention will now be explained in comparison to the problems that occur in a contrasting example in which a smooth reflecting material is mounted on the upper panel of instrument panel/dashboard 64.

FIGS. 14(A) through (C) are drawings to provide an explanation of the undesirable situation which arises in a contrasting example which has a smooth reflecting material 200 on the upper panel of instrument panel/dashboard 64. FIG. 14(A) shows the circumstances when the undesirable situation arises that the rays of the sun 51 reflected by the smooth reflecting material 200 on the top of the dashboard enter the eyes of the driver 67 and the driver feels a glare. FIG. 14(B) shows the circumstances when the undesirable situation arises that the scene outside the vehicle 68 is reflected by the smooth reflecting material 200 on the top of the dashboard and is again reflected by the windshield 61 and is seen by the driver 67. FIG. 14(C) shows the circumstances when the undesirable situation arises that the rays of the sun 51 reflected by the smooth reflecting material 200 on the top of the dashboard heat up the interior components such as the ceiling etc. of the cabin.

As shown in FIGS. 14(A) through (C), three problems can occur when a smooth reflecting material 200 is placed on the upper panel of an instrument panel/dashboard to prevent the upper panel of the instrument panel/dashboard from getting hot from reflecting the incoming rays of the sun 50 coming in through the windshield.

First, as FIG. 14(A) shows, the undesirable situation arises where the rays of the sun 51 are reflected by the smooth reflecting material 200 on the top of the dashboard entering the eyes of the driver 67 and the driver feels a glare.

Secondly, as shown in FIG. 14(B), the undesirable situation of window reflection arises where the view outside the vehicle 68 is reflected by the smooth reflecting material 200 on the top of the dashboard and is reflected again by the windshield 61 and is seen by the driver 67.

Thirdly, as FIG. 14(C) shows, the undesirable situation arises where the rays of the sun 51 are reflected by the smooth reflecting material 200 on the top of the dashboard, into the interior of the vehicle, heating up the interior components such as the ceiling and seats etc. of the cabin.

Figure 7:
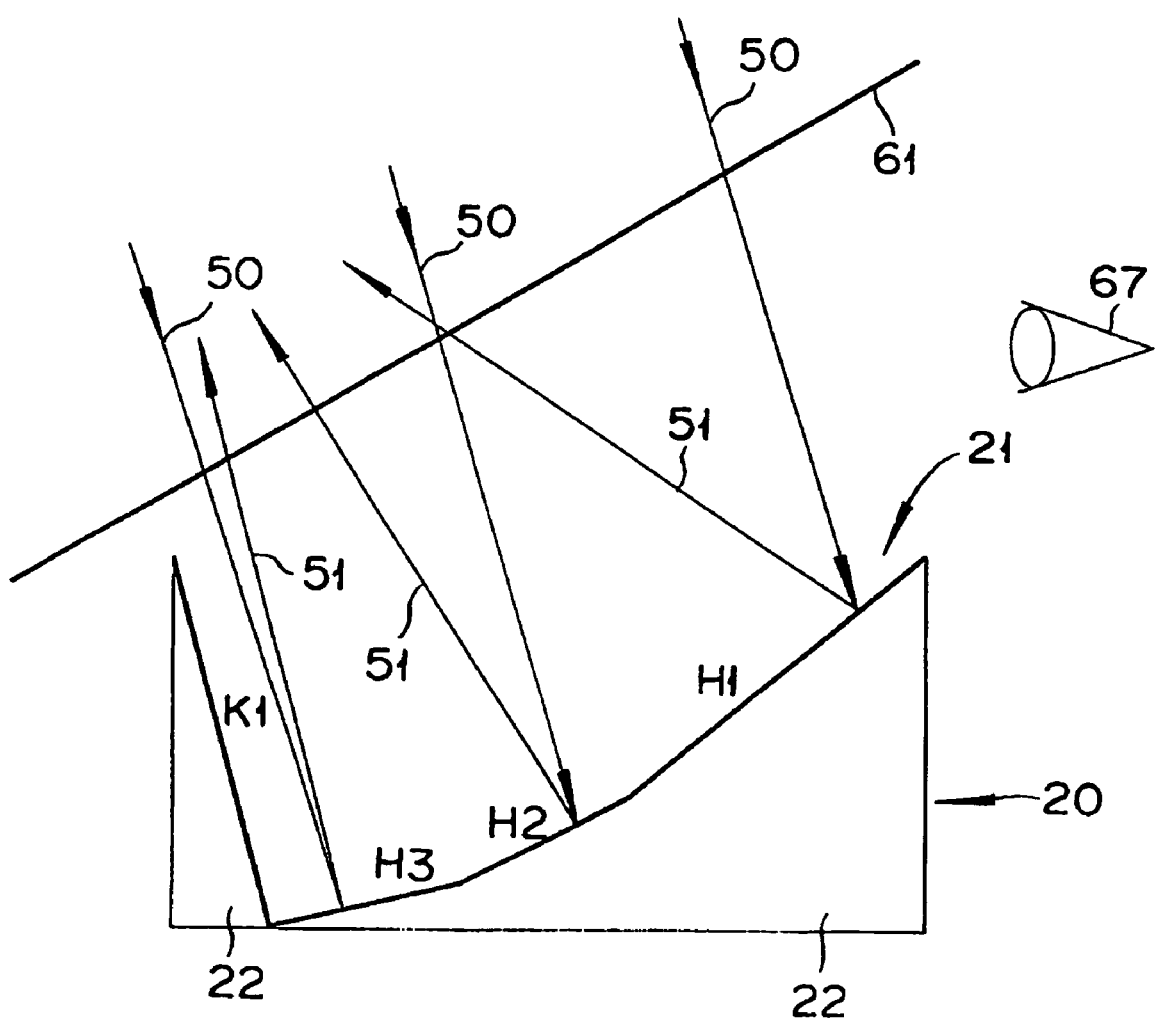
FIG. 7 is a drawing for providing an explanation of the operation of the vehicle interior material of this invention and show the circumstances in which the incoming rays of the sun from the windshield are reflected in a direction toward the windshield by the 3 light reflecting surfaces of the unit reflecting material.
Figure 8:
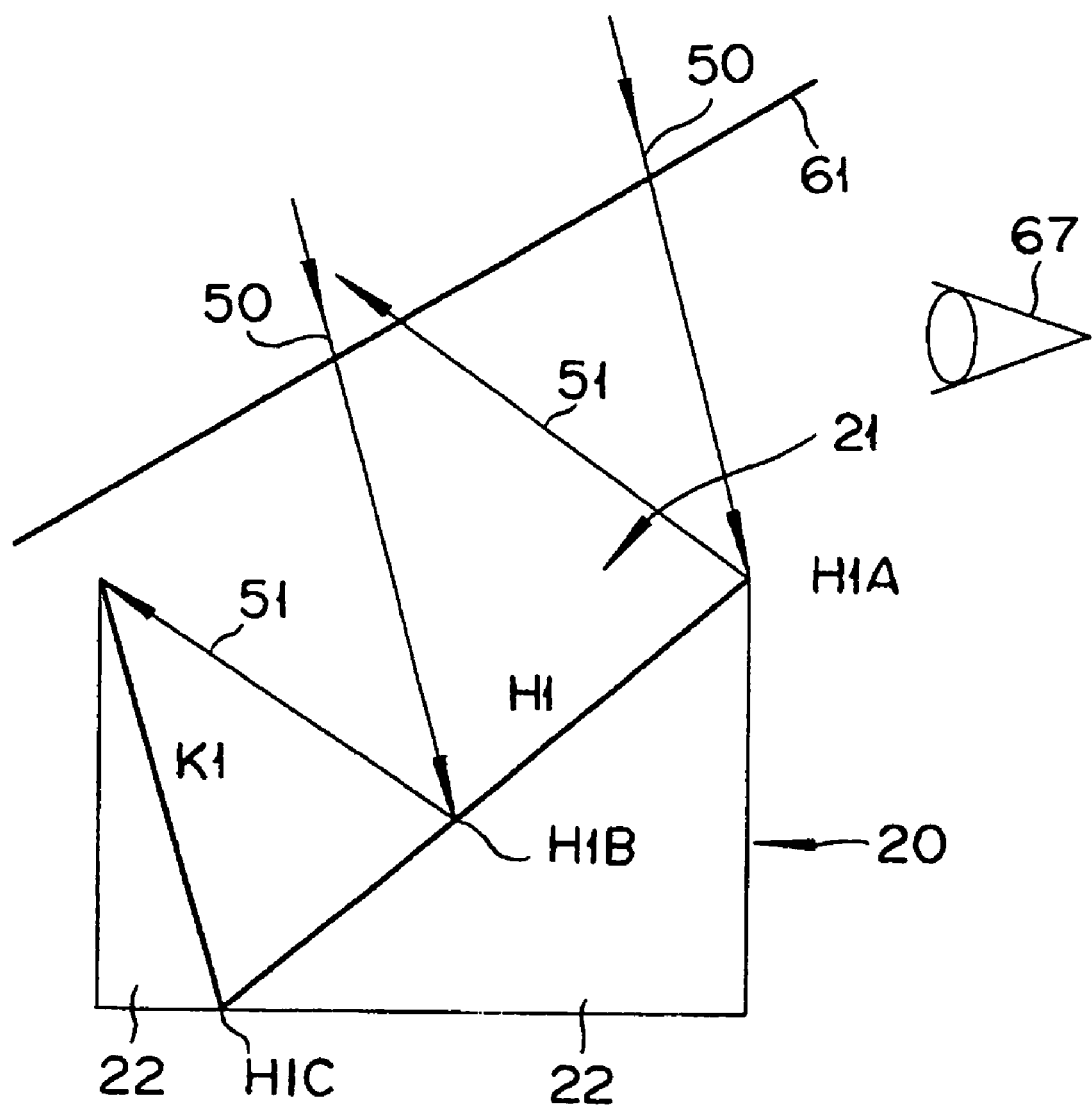
FIG. 8 is a drawing for providing an explanation of the operation of the vehicle interior material of this invention and shows the circumstances in which the rays of the sun reflected by the light reflecting face return to the windshield and strike a light absorbing face.
Figure 9:
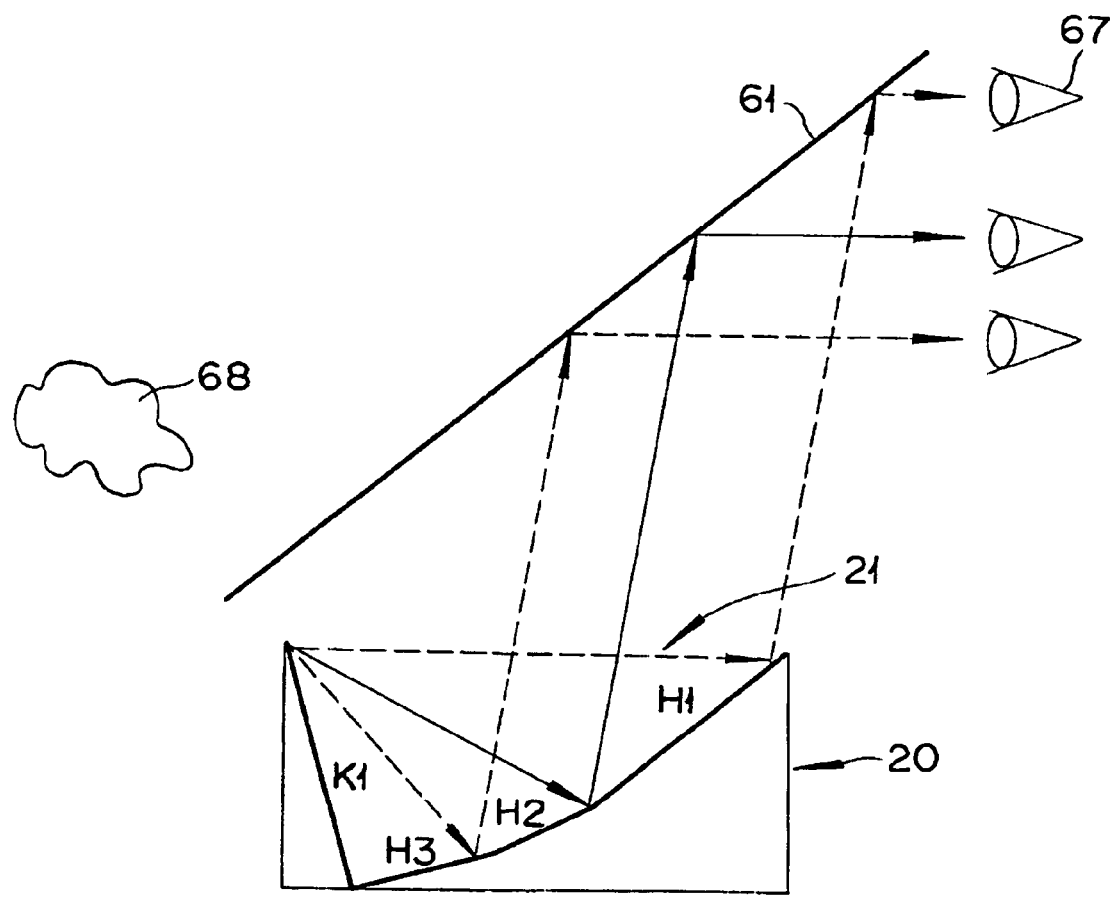
FIG. 9 is a drawing for providing an explanation of the operation of the vehicle interior material of this invention and shows the circumstances in which the view outside the vehicle is prevented from being reflected in the windshield.

FIG. 7, FIG. 8 and FIG. 9 are drawings explaining the operation of the interior surface material for vehicles 40 of this invention. FIG. 7 shows the circumstances in which the incoming rays of the sun 50 entering through the windshield 61 are reflected in a direction toward the windshield 61 by the 3 light reflecting faces H1, H2 and H3 of the unit reflecting material 20. FIG. 8 shows the circumstances in which the rays of the sun 51 are reflected by the light reflecting face and either exit through the windshield 61 or strike a light absorbing face K1. Incidentally, to facilitate easy understanding, FIG. 8 depicts the light reflecting face H1 of unit reflecting material 20 configured with 1 plane. FIG. 9 shows the circumstances in which the view outside the vehicle 68 is prevented from being reflected in the windshield.

The unit reflecting material 20 shown in FIG. 7 has three light reflecting faces, H1, H2 and H3 as well as one light absorbing face K. Light reflecting faces H1, H2 and H3 are oriented relative to windshield 61 while light absorbing face K is oriented relative to the driver. In this case, the incoming rays of the sun 50 from the windshield 61 are reflected in a direction toward the windshield 61 by the three light reflecting faces H1, H2 and H3 of the unit reflecting material 20 and exit through windshield 61. From the fact that the rays of the sun 50 which entered the vehicle cabin from windshield 61 are once again directed out of the vehicle and exit through the windshield 61, most of the heat of the sun's rays 50 is radiated outside the vehicle and the surface of instrument panel/dashboard 64 is prevented from getting hot. Thus, the undesirable circumstance in which the surfaces of interior components become hot from the rays of the sun 50 is solved by interior surface material for vehicles 40. More specifically, the undesirable circumstance that the surfaces of interior components such as instrument panel/dashboard 64 of parked vehicles absorb the heat of the incoming sun's rays 50 from glass windows such as windshield 61 and become very hot, and the undesirable circumstance that passengers feel very hot from the heat radiating from the front of the vehicle, i.e. the dashboard when riding in a vehicle after it has been parked in the blazing sun, are solved.

Likewise, based on the fact that the rays of the sun 50 which entered the vehicle cabin through windshield 61 are once again directed out of the vehicle and exit through the windshield 61, the sunlight 51 reflected by light reflecting faces H1, H2 and H3 does not get in the eyes of the driver. Unit reflecting material 20 of FIG. 8 has one light reflecting face H1 and one light absorbing face K1. Light reflecting face H1 is oriented relative to windshield 61 while light absorbing face K is oriented relative to the driver. Based on the fact that the sunlight 51 reflected in the sector between point H1A and H1B on light reflecting face H is again directed out of the vehicle through windshield 61, the reflected sunlight 51 does not get into the eyes of the driver. On the other hand, the sunlight reflected by the sector between point H1B and H1C on light reflecting face H1 strikes light absorbing face K1 and is absorbed by light absorbing face K1. Because of this the reflected sunlight 51 does not get into the eyes of the driver. Thus, the undesirable circumstances of reflected sunlight 51 getting into the eyes 67 of the driver and the driver sensing a glare is solved by interior surface material for vehicles 40.

The unit reflecting material 20 shown in FIG. 9, similar to the unit reflecting material 20 shown in FIG. 7, has three light reflecting faces, H1, H2 and H3 as well as one light absorbing face K. Light reflecting faces H1, H2 and H3 are oriented relative to windshield 61 while light absorbing face K is oriented relative to the driver. The view outside the vehicle 68 that is reflected by light reflecting faces H1, H2 and H3 and should be seen by the driver reflected on the windshield is cutoff or interrupted by light absorbing face K1, and the view outside the vehicle 68 is not reflected on windshield 61. Thus, the undesirable situation that the view outside the vehicle 68 is reflected on windshield 61 is solved by interior surface material for vehicles 40 and a clear field of vision forward of the vehicle can be assured.

As shown in FIG. 7, the incoming rays of the sun 50 from the windshield 61 are reflected in a direction toward the windshield 61 by the three light reflecting surfaces/faces H1, H2 and H3 of the unit reflecting material 20 and are not reflected toward the interior of the vehicle. Based on the fact that the rays of the sun 50 which entered the vehicle cabin through windshield 61 are once again directed out of the vehicle through windshield 61, and most of the heat of the sun's rays 50 is radiated outside vehicle, the ceiling and seats inside the car do not get hot. Thus, the rays of the sun 51 are not reflected toward the interior of the vehicle and the undesirable circumstance that the ceiling 69 and seats get hot is solved by interior surface material for vehicles 40.

When using the reflecting material 10 of this invention for interior surface material for vehicles 40 it is important to consider the angles of window glass such as the windshield 61 and rear window 62 as well as the relationship to the angle of inclination of interior components such as instrument panel/dashboard 64. This is important for achieving both the capacity to prevent reflection of views outside the vehicle in the windows and driver glare, as well as the capacity to reflect solar energy and prevent the temperature inside a vehicle from rising, capacities which are in a paradoxical relationship.

Figure 10:
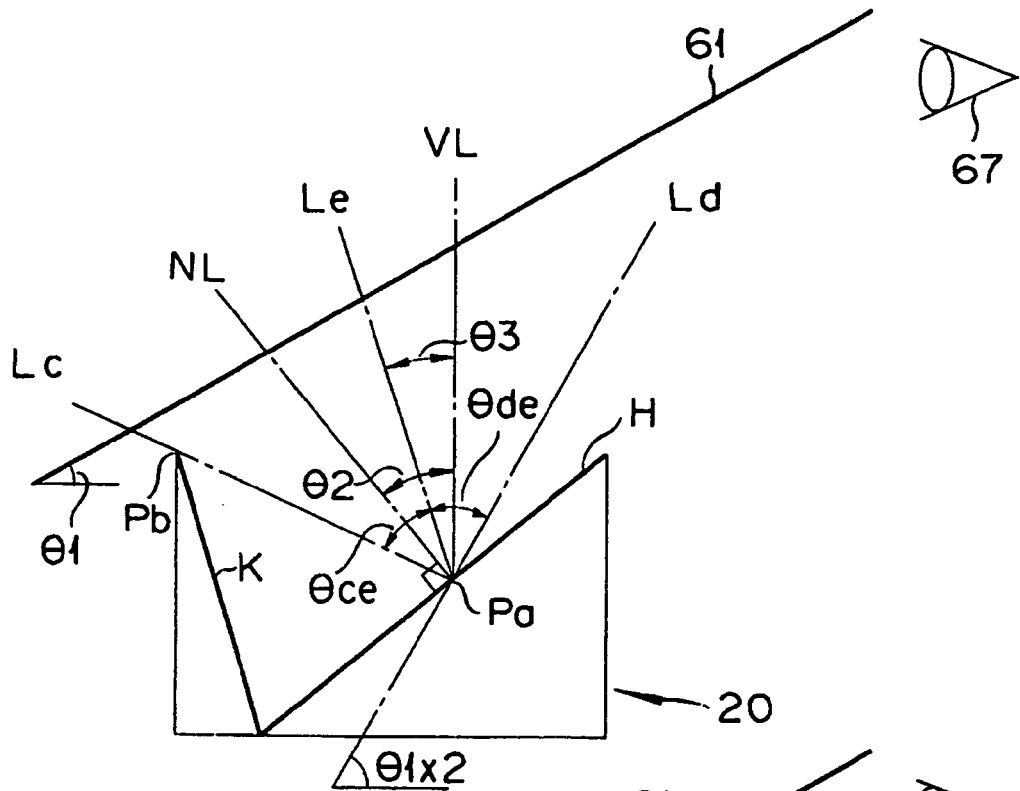
FIGS. 10(A) and (B) are drawings for providing an explanation of the conditions that must be fulfilled in the interior materials for vehicles used in the vehicle structure which places a windshield inclined relative to the top of the instrument panel/dashboard for continuing to prevent window reflection and glare to the driver as well as reflecting the energy of the sunlight and preventing the temperature in the vehicle interior from rising, capacities which are contradictory.
Figure 10:
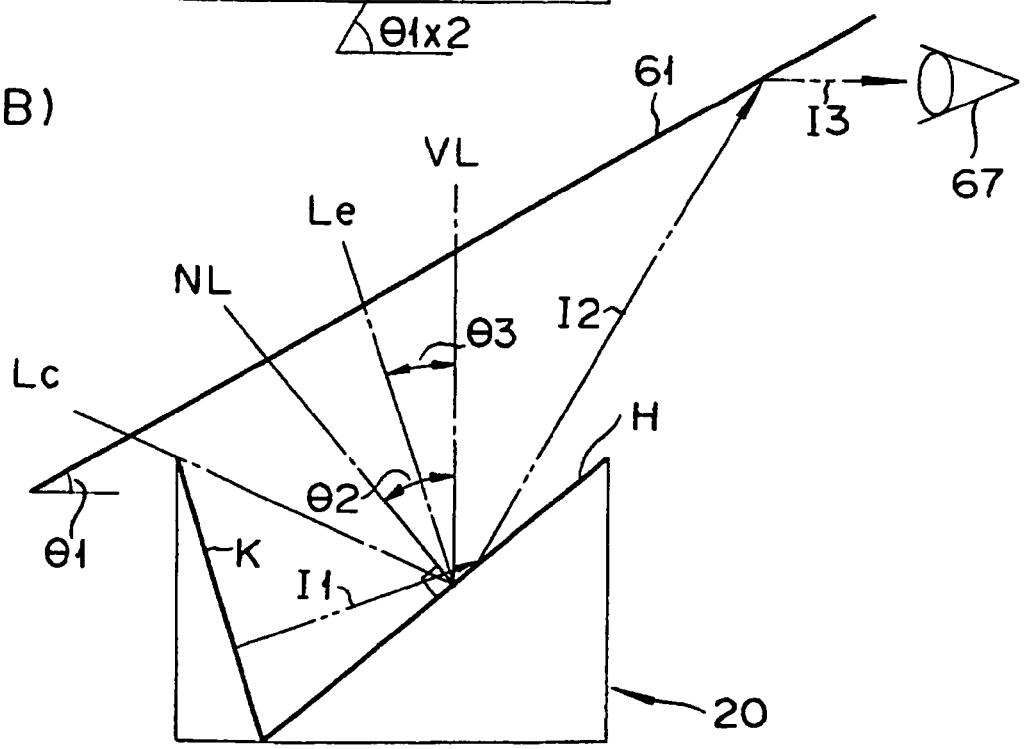
Figure 11:
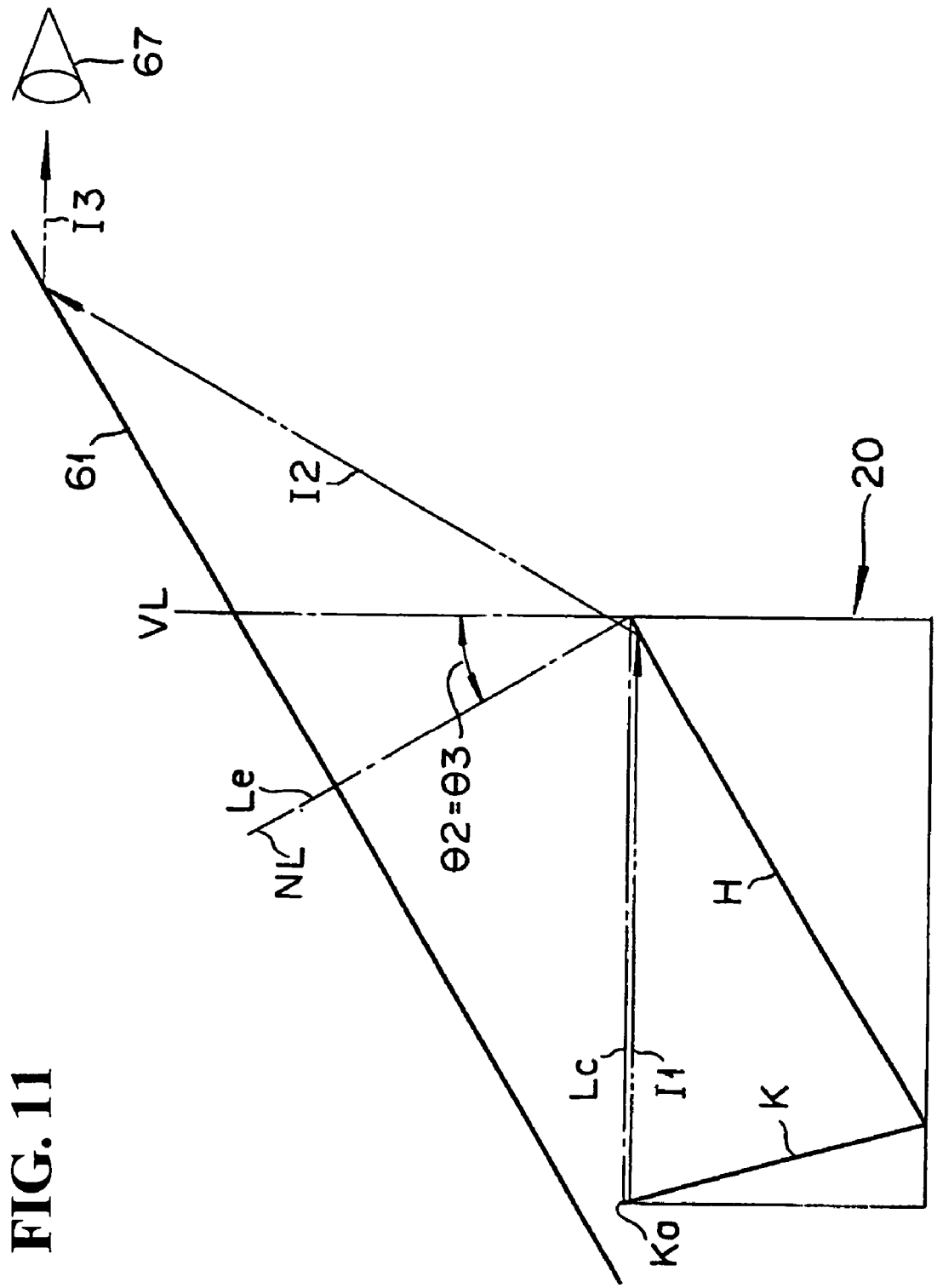
FIG. 11 is a drawing for providing the same explanation as FIG. 10.
Figure 12:
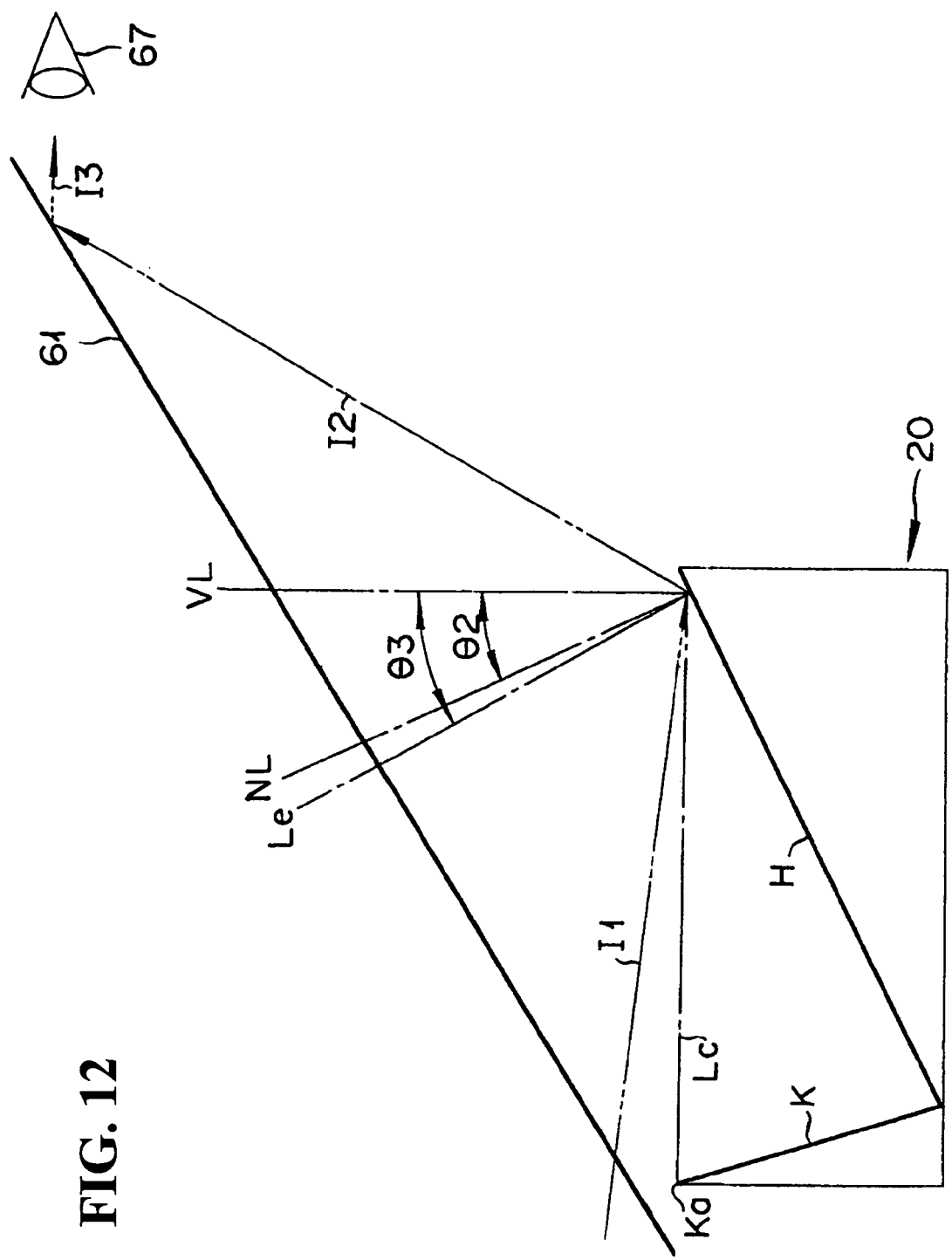
FIG. 12 is a drawing for providing the same explanation as FIG. 10.

FIGS. 10(A) and (B), FIG. 11 and FIG. 12 are conceptual drawings explaining the conditions that must be fulfilled by the interior materials for vehicles when used in a vehicle structure which places a windshield 61 inclined relative to the top of the instrument panel/dashboard 64 to continue preventing window reflection and glare to the driver as well as reflecting the energy of the sunlight and preventing the temperature in the vehicle interior from rising, capacities which are contradictory.

Referring to FIG. 10(A), interior surface material for vehicles 40 are shown used in a vehicle body structure which places windshield 61 inclined to the top of instrument panel/dashboard 64, with the line connecting an arbitrarily selected point Pa on light reflecting face H relative to windshield 61 and point Pb on the tip of light absorbing face K, which is relative to the driver, is straight line Lc. The straight line, Ld, has twice the angle of inclination of the windshield's angle of inclination θ1 and passes through point P. Likewise, the line which has an angle of inclination between straight line Lc and straight line Ld (θce=θde) and, passes through arbitrarily selected point Pa is line Le. The angle θ2 of normal line NL of unit reflecting material 20, which passes through arbitrarily selected point Pa, should be greater than the angle θ3 of straight line Le and vertical line VL. By specifying that angle θ2≧angle θ3, light reflecting face H will have the configuration that will prevent window reflections.

Incidentally, even when the surface on which interior surface material for vehicles 40 is installed inclines from the horizontal, the angle of inclination of the installed surface will have the angle conditions noted above.

Referring to FIG. 10(B), for a view outside the vehicle to be visible in a window reflection when angle θ2>angle θ1, the light beams of the image of a scene outside a vehicle 68 needs to move in the order I 1→I 2→I 3→Driver's eyes, as is illustrated by the two dotted lines. However, because the starting point for arrow I 1 is on light absorbing face K, the image of a view outside a vehicle 68 cannot penetrate and the window reflection will not occur. Thus when angle θ2>angle θ3, a view outside a vehicle 68 is interrupted in light absorbing face K and is not reflected in the window.

Referring to FIG. 11, for a view outside the vehicle 68 to be visible in a window reflection, when angle θ2>angle θ3, the light beams of the image of a scene outside a vehicle 68 need to move in the order I 1→I 2→I 3→Driver's eyes, as is illustrated by the two dotted lines. However, because the starting point for arrow I 1 is on the upper end of light absorbing face Ka the image of a view outside a vehicle 68 cannot penetrate and the window reflection will not occur. Thus when angle θ2=angle θ3, a view outside a vehicle 68 is interrupted in the upper end of light absorbing face Ka, and thus does not reflect in the window.

Referring to FIG. 12, when angle θ2<angle θ3, the light beams of the image of a view outside a vehicle 68 move in the order I 1→I 2→I 3→Driver's eyes without being interrupted by light absorbing face K, as is illustrated by the two dotted lines. Because of this, the reflection in the window occurs.

From the above, when angle θ2≧angle θ3 light reflecting face H will not permit window reflection. Likewise, since light reflecting face H is facing windshield 61, solar energy is reflected toward windshield 61 and the rise in temperature in the vehicle interior is suppressed. Furthermore, since light absorbing face K is facing toward the driver, it can prevent driver glare. Thus, it is possible to continue to prevent window reflection and glare to the driver as well as reflect the energy of the sunlight and prevent the temperature in the vehicle interior from rising, capacities which are contradictory.

Figure 13:
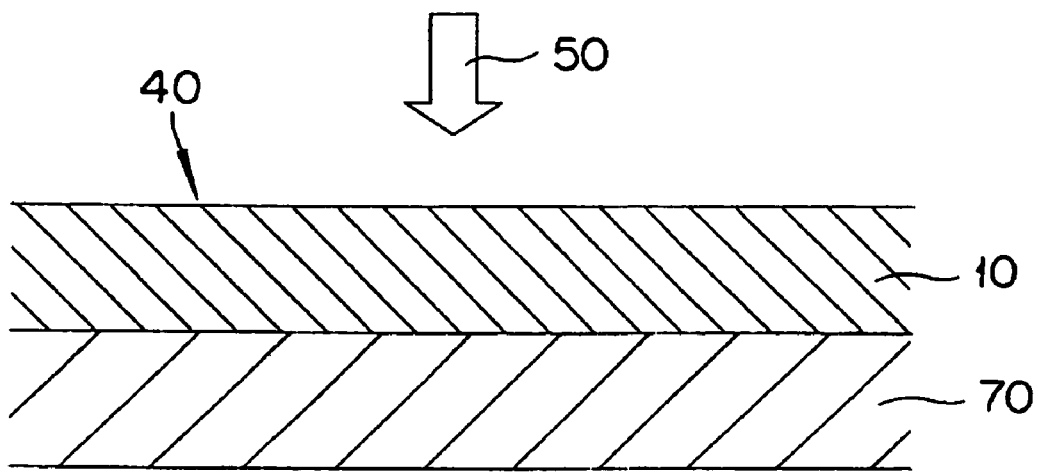
FIG. 13(A) is a cross-sectional drawing showing an embodiment which disposes material with thermal conducting properties on the back face of light reflecting materials.
FIG. 13(B) is a cross-sectional drawing showing an embodiment which enhances the effect of releasing/radiating the heat of the vehicle interior to the vehicle exterior.
Figure 13:
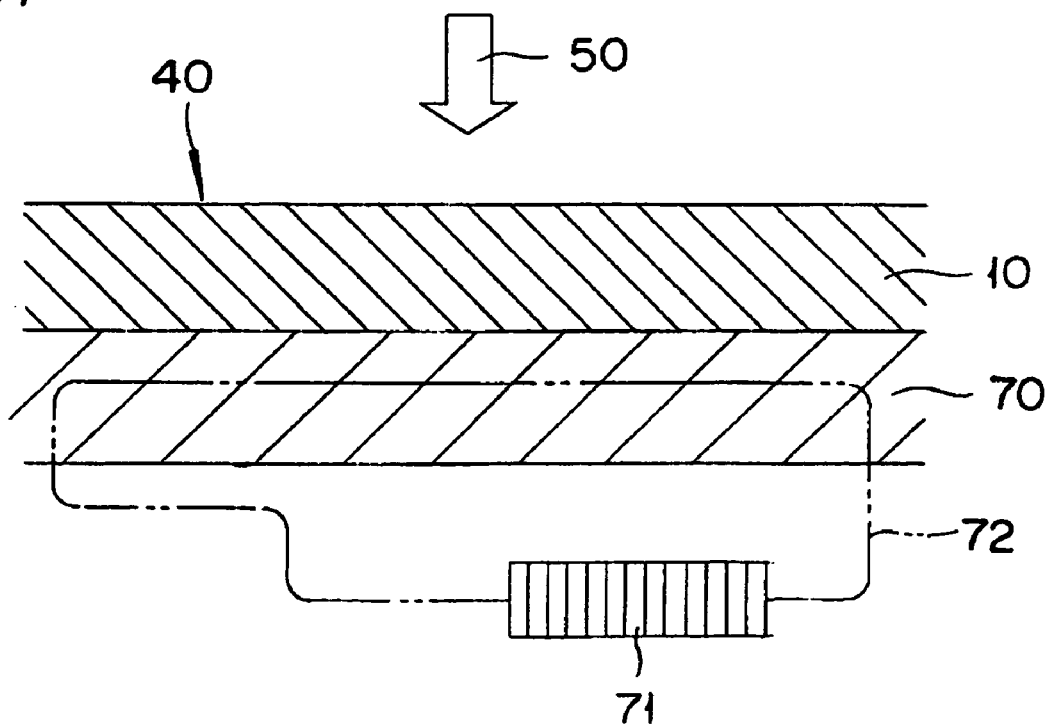

FIG. 13 (A) is a cross-sectional drawing showing an embodiment which disposes material with heat conducting properties on the back face of light reflecting material 10.

As is illustrated in FIG. 13(A), when the previously described reflecting material 10 is applied to interior surface material for vehicles 40, it is preferable to dispose thermal conductive material 70 on the back side of reflecting material 10 to radiate heat inside to the outside.

That is because reflecting material 10 can direct the thermal energy accumulated in reflecting material 10 to the back side of interior components and in turn outside the vehicle, and radiate the heat of the interior of the vehicle to its exterior, reducing even further the heat released in the interior and easing the thermal environment of a vehicle parked in the blazing sun.

Specifically, for good thermal conductive materials 70 disposed on the back side of reflecting material 10, metallic powders, metallic fiber, metallic meshes, metal plated, carbon powder, carbon fiber, ceramic powder, ceramic fiber, ceramic mats can be used by themselves or in combinations (either containing or laminating them are extremely effective).

FIG. 13(B) is a cross-sectional drawing showing an embodiment which enhances the effect of releasing/radiating the heat of the vehicle interior to the vehicle exterior.

As is illustrated in FIG. 13(B), connecting thermal conductive material 70 to radiating device 71 placed outside of the vehicle can radiate heat from inside a vehicle to its exterior. More specifically, a loop type heat pipe 72 is disposed on thermal conductive material 70 placed on the back side of reflecting material 10. A radiating fin 71 (corresponding to a radiator) is disposed on the outside of a vehicle. The heat of the hot air in the interior of a vehicle in contact with reflecting material 10 can be progressively radiated outside a vehicle through the back side of reflecting material 10, improving the thermal environment in a vehicle when it is parked in the blazing sun.

Incidentally, the reflecting material 10 of this invention should normally be applied when one wishes to prevent a rise in surface temperatures in interior components on which direct sunlight strikes. In that sense, reflecting material 10 can be used with vehicles in general and common interior items but particularly with automobiles where the effect of this invention is conspicuous because the temperature environment in the blazing sun is so bad.

The following embodiments and comparative examples will be explained but this invention is not limited to these embodiments. The configuration and effects of embodiments and comparative examples are shown in Table 1 and Table 2. With respect to the "window reflection properties" row for results, the reflecting material to be tested was installed in vehicles, and whether or not the window reflection properties of the given material were irritating or not irritating within the range of their individual fields of vision was ascertained by numerous persons (samplers) who sampled the facing materials. For the results of this sensory evaluation, those embodiments which were judged to not be irritating by 90% or more of the samplers were considered "OK" (satisfactory). Embodiments which were judged to not be irritating by less than 90% of the samplers were considered "NG" (unsatisfactory). The reflected radiant heat performance percentage indicates the percentage of sun's rays coming in from a windshield that are reflected back toward the windshield. The instrument panel/dashboard surface temperature indicates the highest surface temperature of reflecting material when the reflecting material was installed on the upper panel of an instrument panel/dashboard in a vehicle parked facing south in the scorching summer sun in the suburbs in the Tokyo metropolitan area.

TABLE 1

Figure 15:
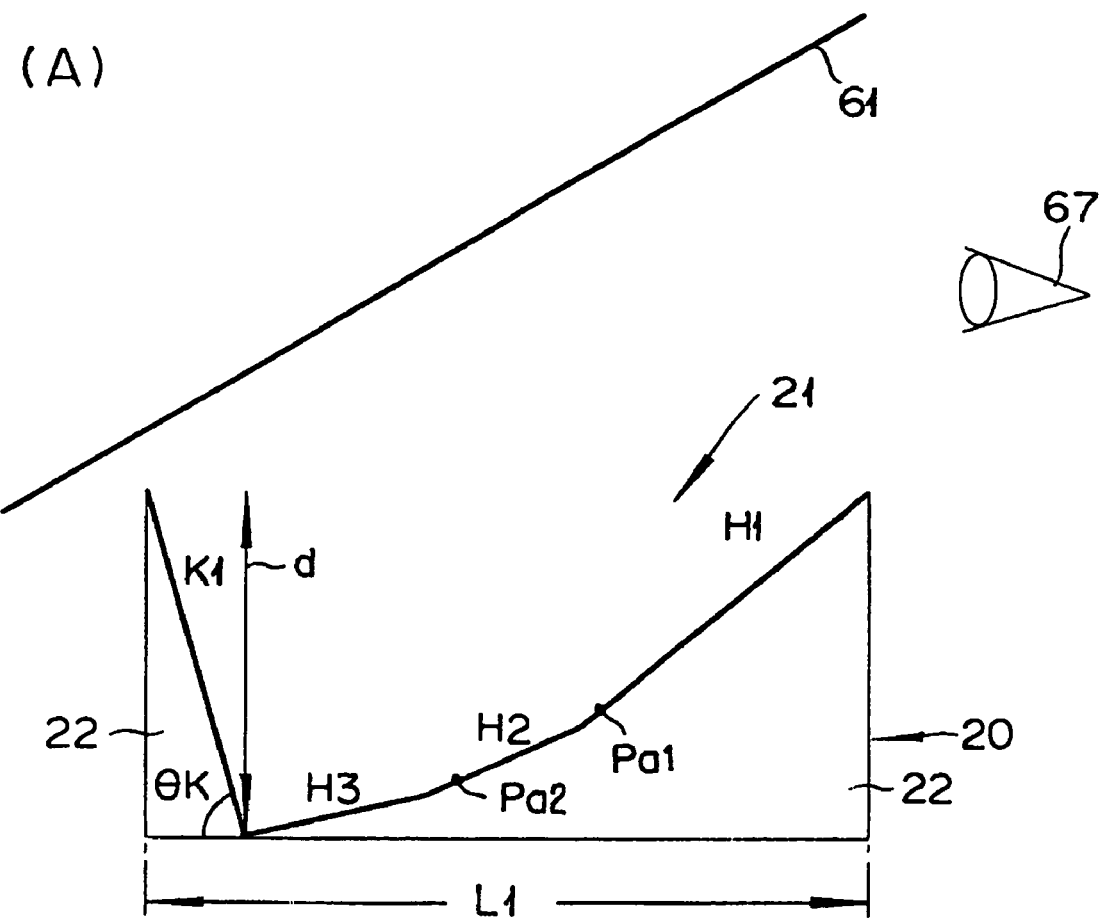
FIG. 15(A) is a blown-up view of a unit reflecting material of a first embodiment which applies this invention to an instrument panel/dashboard.
FIG. 15(B) is a perspective view showing the arrangement of unit reflecting material.
Figure 15:
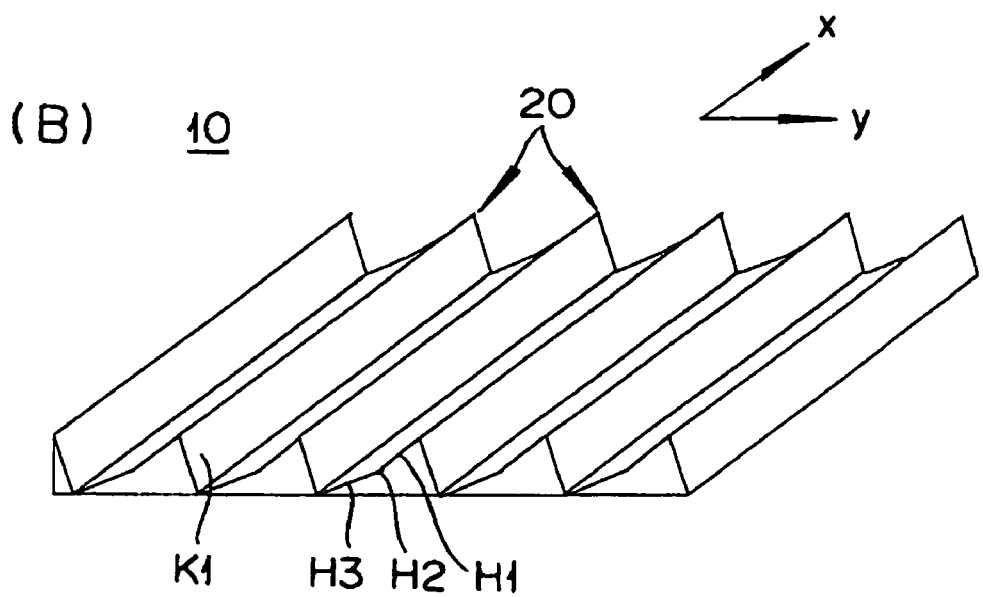
Figure 16:
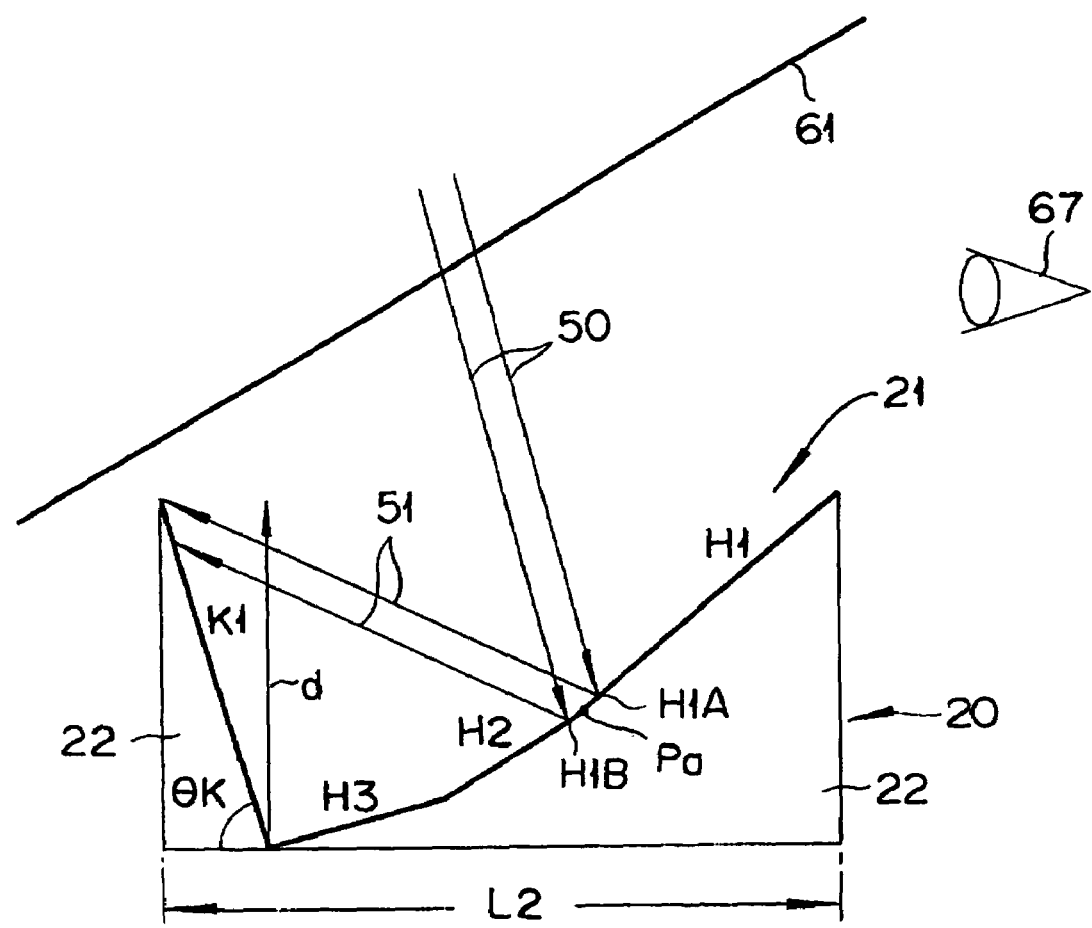
FIG. 16 is a blown-up view of a unit reflecting material of a second embodiment which applies this invention to an instrument panel/dashboard.
Figure 17:
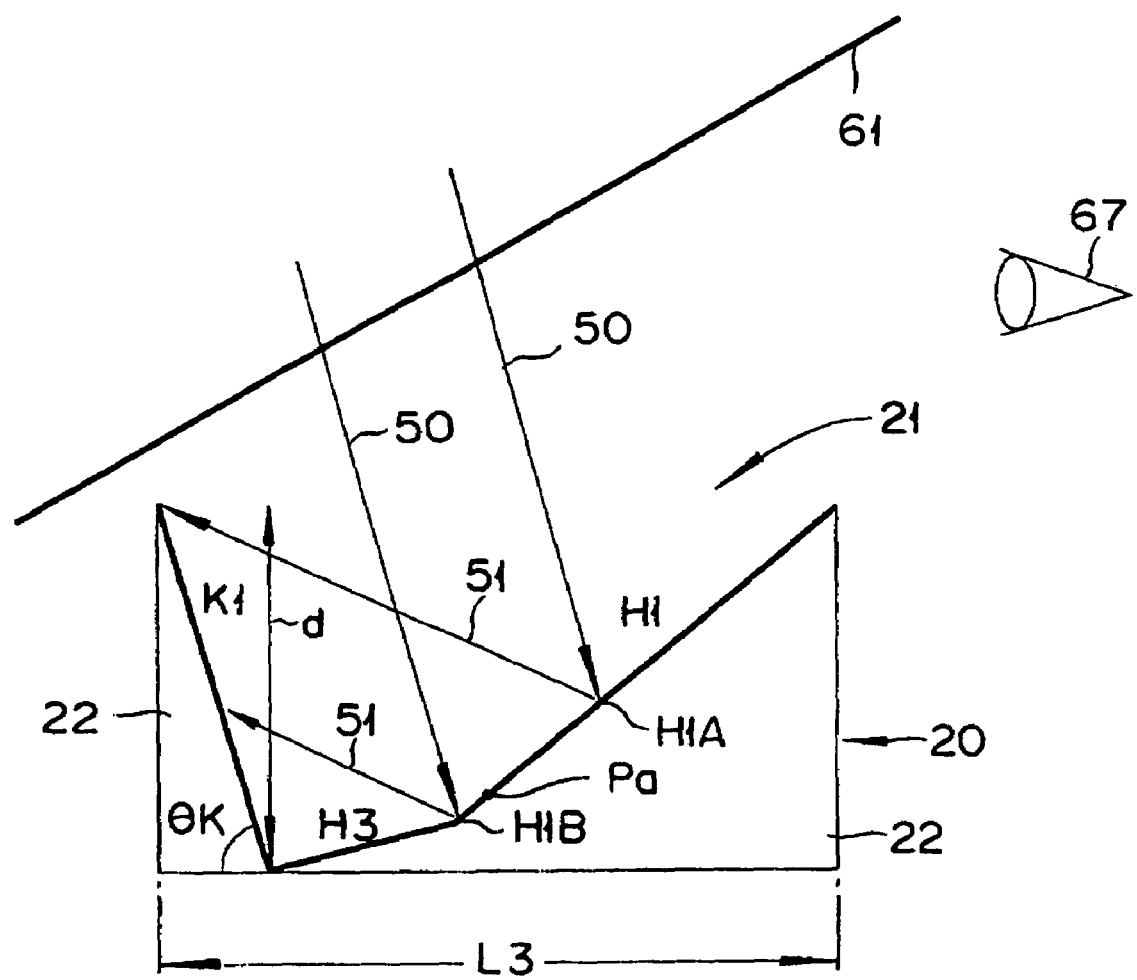
FIG. 17 is a blown-up view of a unit reflecting material of a third embodiment which applies this invention to an instrument panel/dashboard.
Figure 18:
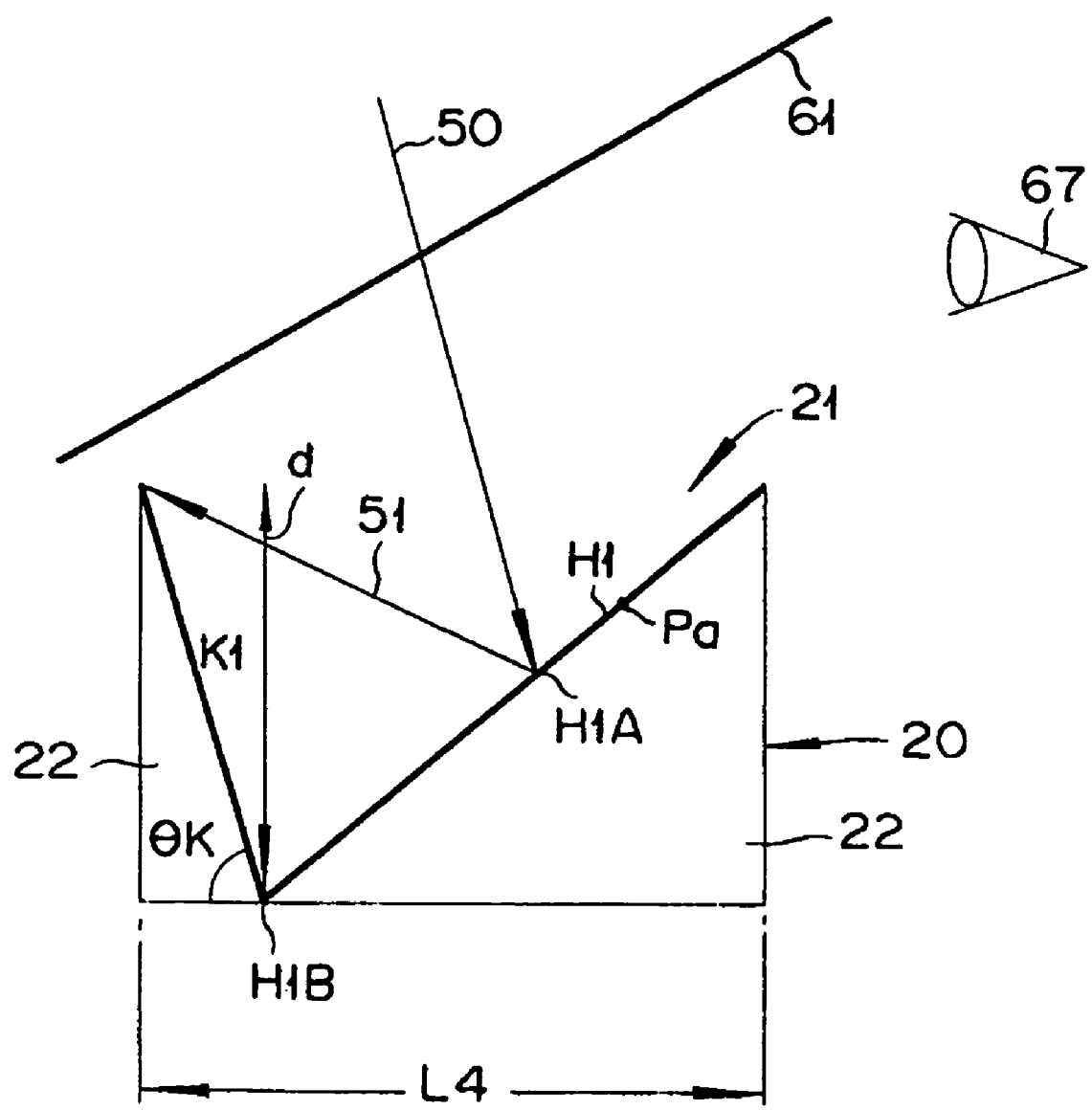
FIG. 18 is a blown-up view of a unit reflecting material of a fourth embodiment which applies this invention to an instrument panel/dashboard.
Figure 19:
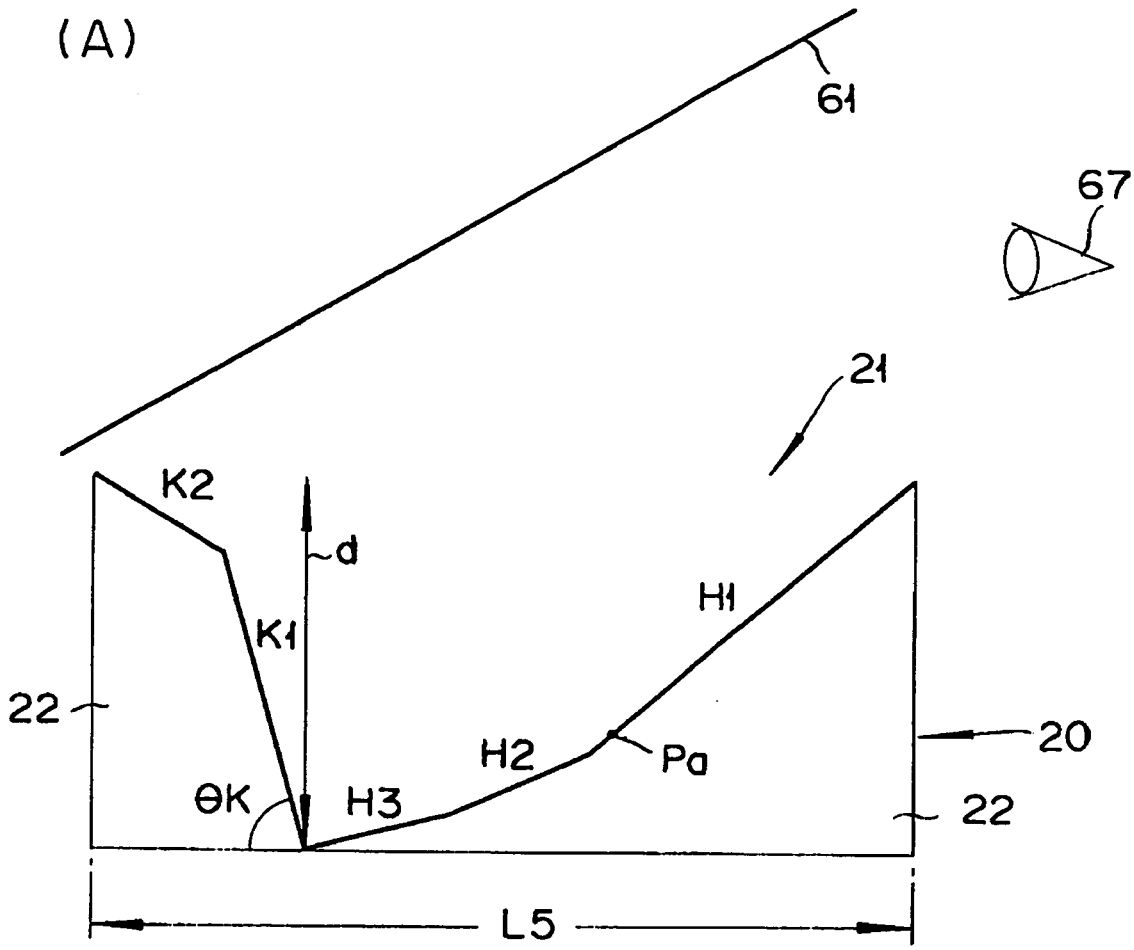
FIG. 19(A) is a blown-up view of a unit reflecting material of a fifth embodiment which applies this invention to an instrument panel/dashboard.
FIG. 19(B) is a perspective view showing the arrangement of unit reflecting material.
Figure 19:
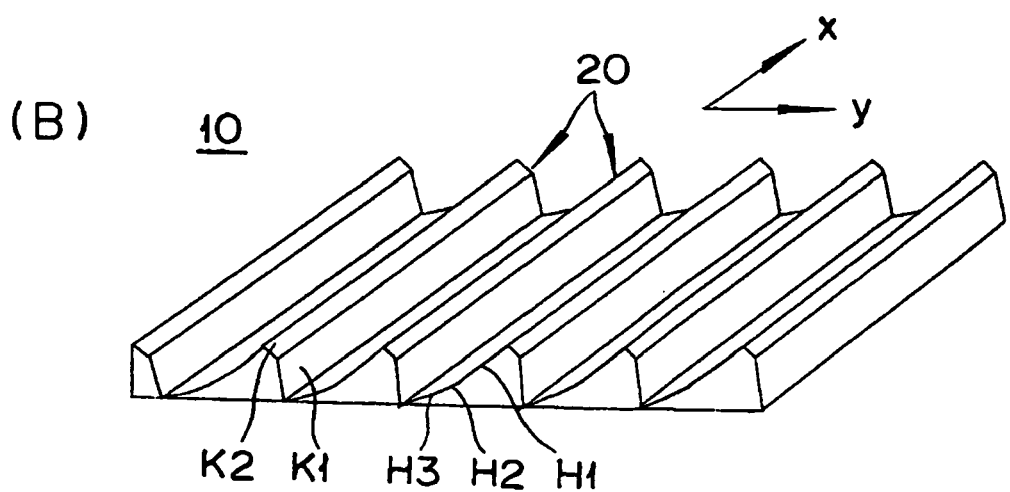
Figure 20:
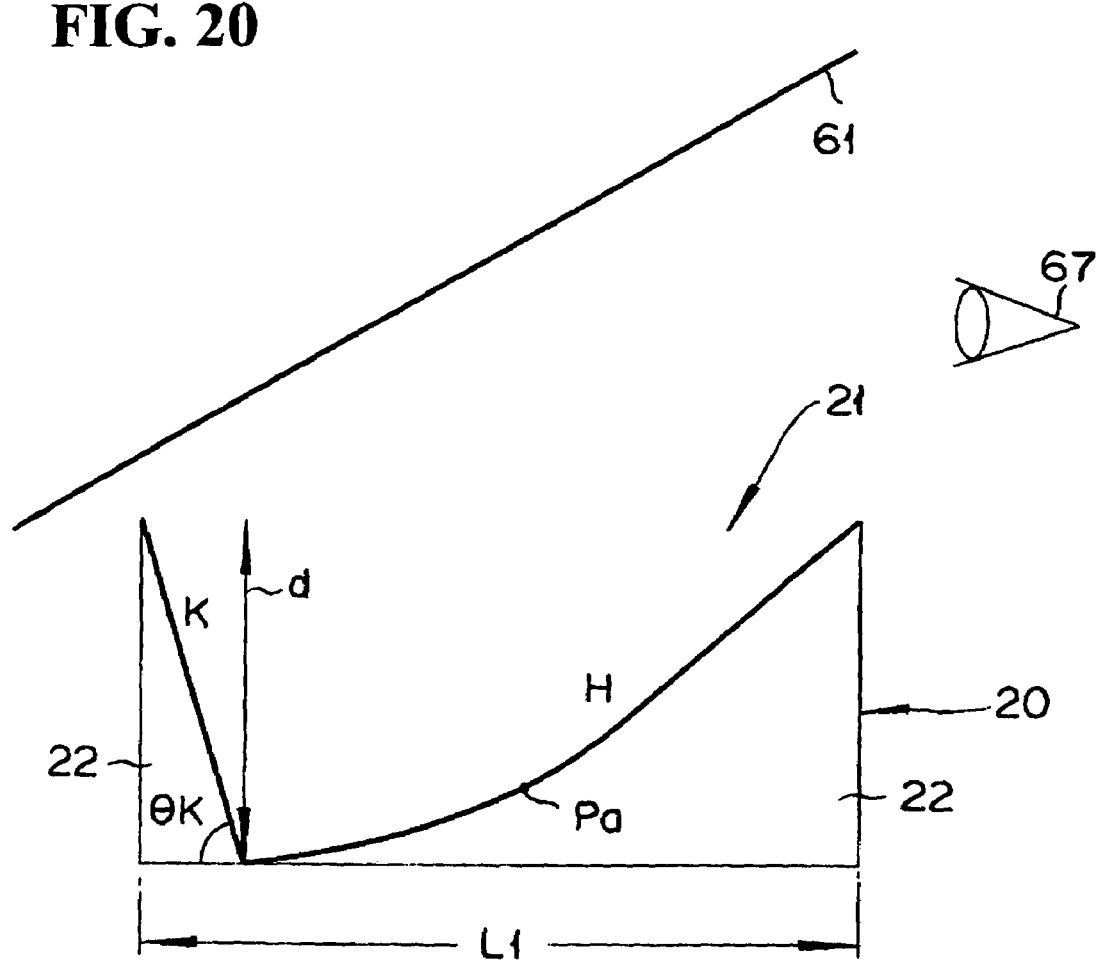
FIG. 20 is a blown-up view of a unit reflecting material of a sixth embodiment which applies this invention to an instrument panel/dashboard.
Figure 21:
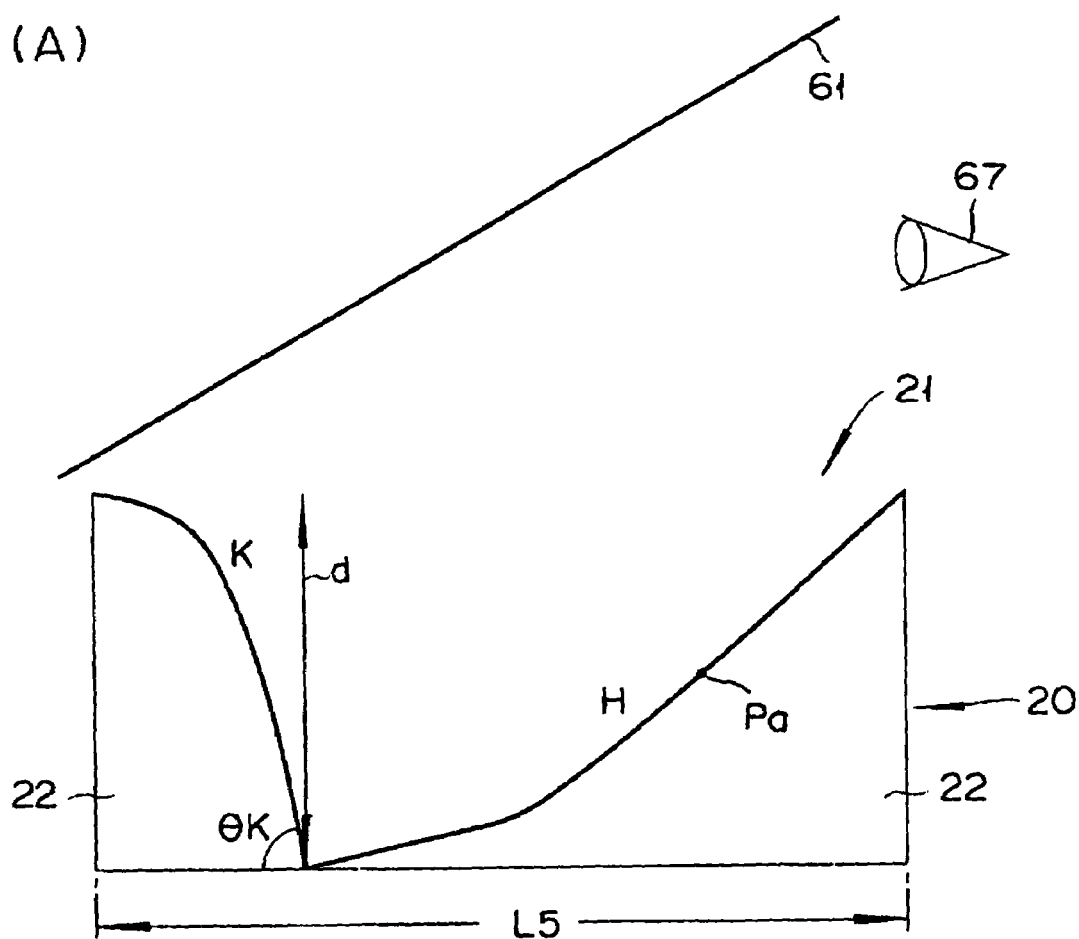
FIG. 21(A) is a blown-up view of a unit reflecting material of a seventh embodiment which applies this invention to an instrument panel/dashboard.
FIG. 21(B) is a perspective view showing the arrangement of unit reflecting material.
Figure 21:
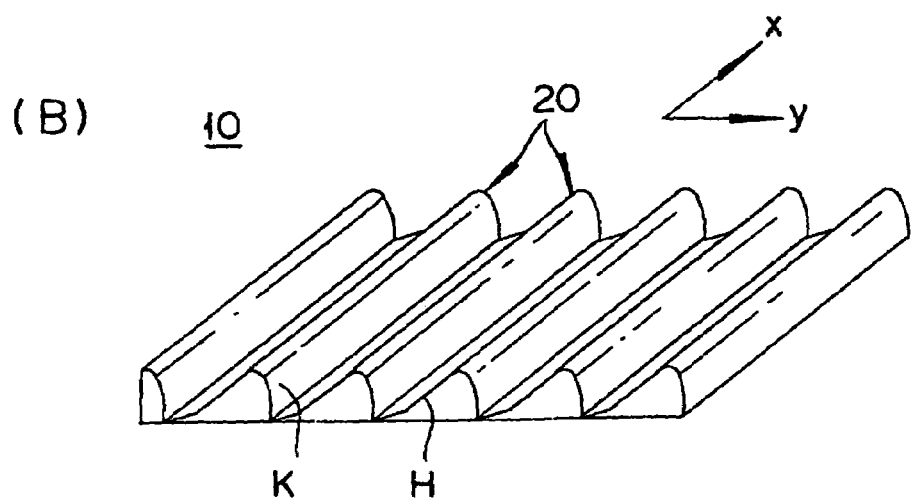

| | | | | First Embodiment | Second Embodiment | Third Embodiment | Fourth Embodiment | Fifth Embodiment | Sixth Embodiment | Seventh Embodiment |
|---|---|---|---|---|---|---|---|---|---|---|
| Config-uration | Shape | Shape Of Profile Of Unit Reflecting Material | Profile Appearance | Polygon Shape | ← | ← | ← | Irregular Polygon | Curved Line Shape | ← |
| | | | Depth of Concave Cross-Sectional Surface (μm) | 250 | ← | ← | ← | 330 | 250 | 330 |
| | | | Drawing | FIG. 15(A) | FIG. 16 | FIG. 17 | FIG. 18 | FIG. 19(A) | FIG. 20 | FIG. 21(A) |
| | | Bird's Eye Shape Of Reflecting Facing Material | Shape | Line Gap Shape | ← | ← | ← | ← | ← | ← |
| | | | Drawing | FIG. 15(B) | ← | ← | ← | FIG. 19(B) | FIG. 15(B) | FIG. 21(B) |
| | Light Reflecting Face H Of Unit Reflecting Material | | Material | Aluminum Vapor Deposit | ← | ← | ← | ← | ← | ← |
| | | | Total Rate Of Reflection (%) | 90 | ← | ← | ← | ← | ← | ← |
| | Light Absorbing Face K Of Unit Reflecting Material | | Material | Black TPO + Aluminum Vapor Deposit | ← | ← | ← | ← | ← | ← |
| | | | Total Rate Of Reflection (%) | 5 | ← | ← | ← | ← | ← | ← |
| | Reflecting Material Sheet Substrate | Resin Color Injection | Material Color Material Color | TPO Black — — | ← ← — — | ← ← — — | ← ← — — | ← ← — — | ← ← — — | ← ← — — |
| Result | Window reflection properties | | | Ok | ← | ← | ← | ← | ← | ← |
| | Reflected Radiated Heat Performance (%) | | | 90 | 85 | 65 | 40 | 75 | 90 | 75 |
| | Instrument Panel/Dashboard Surface Temperature (° C.) | | | 60 | 62 | 71 | 82 | 67 | 60 | 67 |
| | Overall Evaluation | | | ◎ | ◎ | ◎ | ○ | ◎ | ◎ | ◎ |

TABLE 2

| | | | | Eighth Embodiment | Ninth Embodiment | Tenth Embodiment | Eleventh Embodiment | Twelfth Embodiment |
|---|---|---|---|---|---|---|---|---|
| Configuration | Shape | Shape Of Profile Of Unit Reflecting Material | Profile Appearance | Polygon Shape | ← | ← | ← | ← |
| | | | Depth of Concave Cross-Sectional Surface (μm) | 50 | 40 | 1000 | 1200 | 250 |
| | | | Drawing | FIG. 15(A) | ← | ← | ← | ← |
| | | Bird's Eye Shape Of Reflecting Facing Material | Shape | Line Gap Shape | ← | ← | ← | ← |
| | | | Drawing | FIG. 15(B) | ← | ← | ← | ← |
| | Light Reflecting Face H Of Unit Reflecting Material | | Material | Aluminum Vapor Deposit | ← | ← | ← | ← |
| | | | Total Rate Of Reflection (%) | 90 | ← | 34 | 23 | 90 |
| | Light Absorbing Face K Of Unit Reflecting Material | | Material | Black TPO + Aluminum Vapor Deposit | ← | ← | ← | ← |
| | | | Total Rate Of Reflection (%) | 15 | 20 | 5 | ← | ← |

TABLE 2-continued

| | | | | | | | | |
|---|---|---|---|---|---|---|---|---|
| | Reflecting Material Substrate | Resin Sheet | Material | TPO | ← | ← | ← | — |
| | | | Color | Black | ← | ← | ← | — |
| | | Injection | Material | — | — | — | — | PP |
| | | | Color | — | — | — | — | Black |
| Result | Window Reflection Properties | | | ← | NG | OK | ← | ← |
| | Reflected Radiated Heat Performance (%) | | | 90 | 90 | 34 | 23 | 90 |
| | Instrument Panel/Dashboard Surface Temperature (° C.) | | | 60 | 60 | 85 | 90 | 60 |
| | Overall Evaluation | | | ⊙ | X | ○ | ○ | ⊙ |

Figure 14:
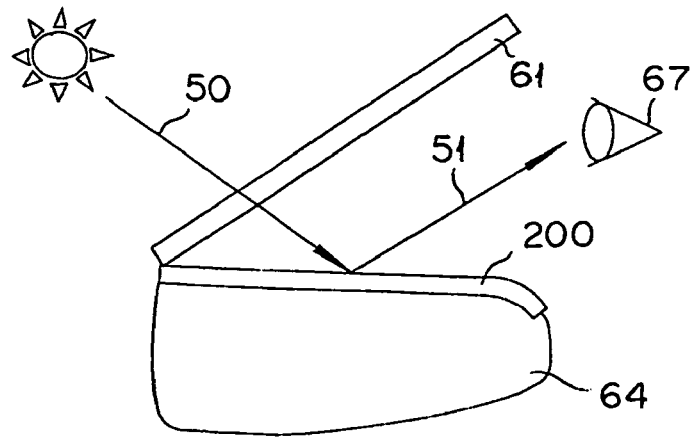
FIGS. 14(A) through (C) are drawings to provide an explanation of the undesirable situation which arises in a contrasting example which has a smooth reflecting material on the top of a dashboard.
Figure 14:
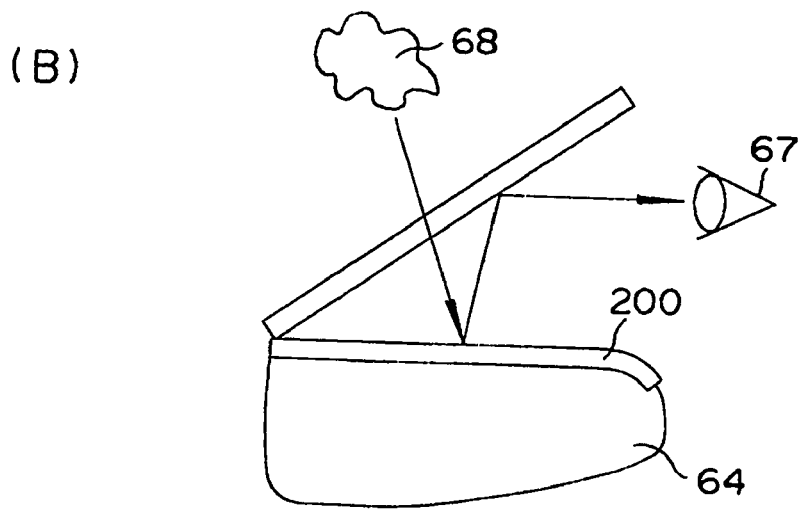
Figure 14:
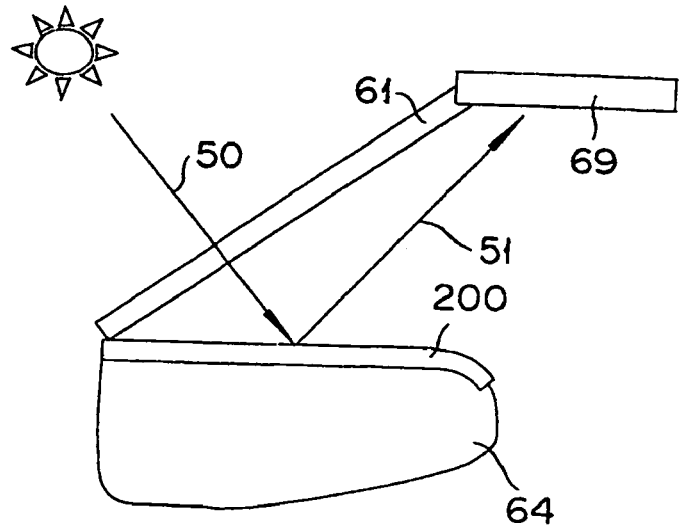
Figure 22:
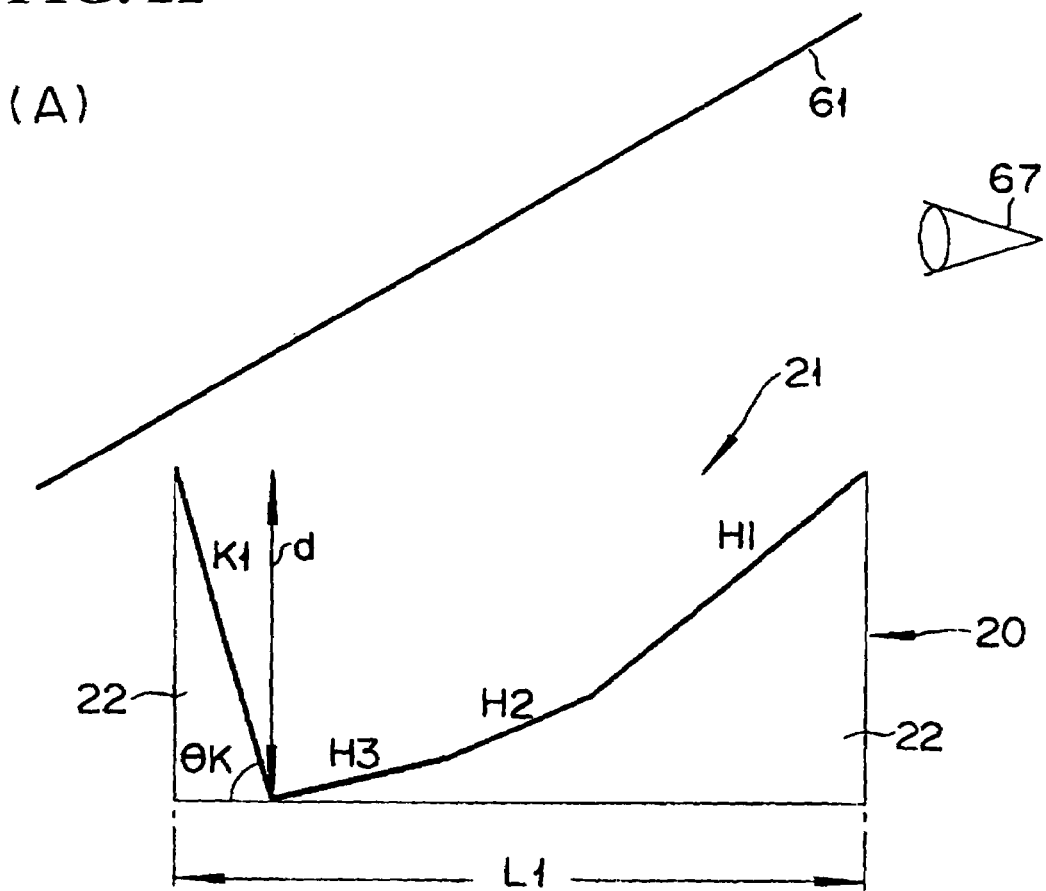
FIG. 22(A) is a blown-up view of a unit reflecting material of a thirteenth embodiment which applies this invention to an instrument panel/dashboard.
FIG. 22(B) is a perspective view showing the arrangement of unit reflecting material.
Figure 22:
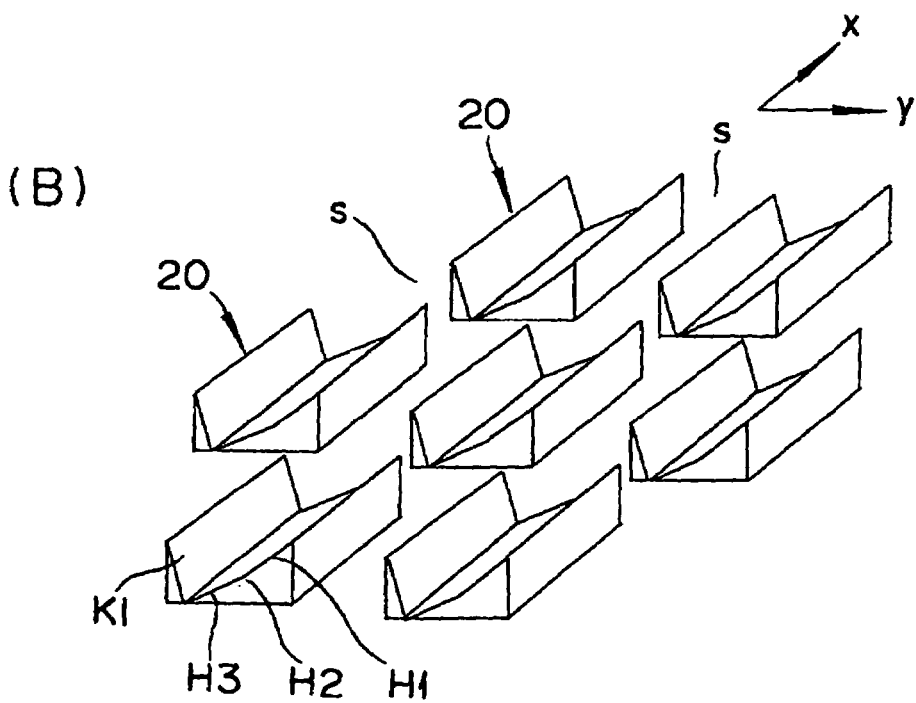
Figure 23:
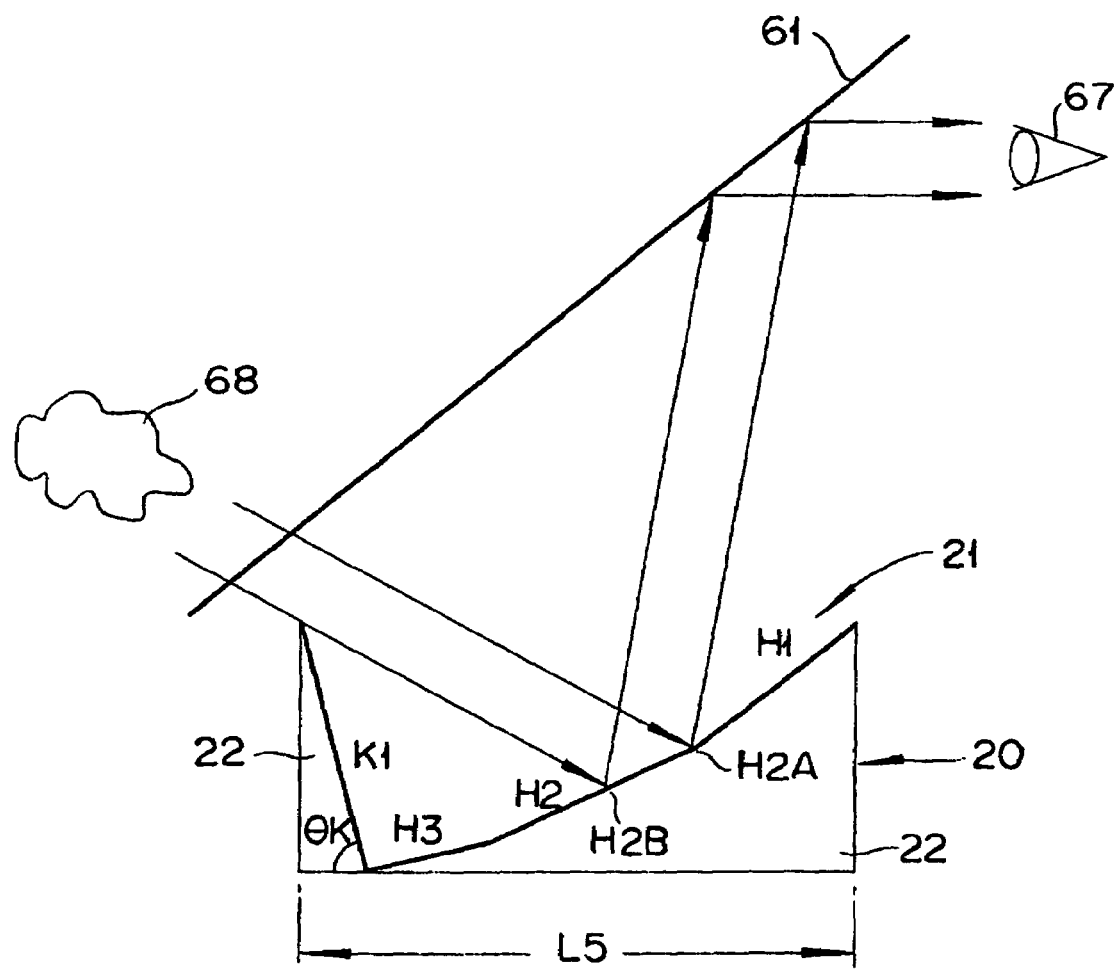
FIG. 23 is a blown-up view of a unit reflecting material of a fourteenth embodiment which applies this invention to an instrument panel/dashboard.

| | | | | Thirteen Embodiment | Fourteenth Embodiment | First Comparative Example | Second Comparative Example |
|---|---|---|---|---|---|---|---|
| Configuration | Shape | Shape Of Profile Of Unit Reflecting Material | Profile Appearance | | ← | Plate Shape | Plate Shape |
| | | | Depth of Concave Cross-Sectional Surface (μm) | | ← | | |
| | | | Drawing | FIG. 22(A) Particle Gap Shape | FIG. 23 Line Gap Shape | — | FIG. 14 |
| | | Bird's Eye Shape Of Reflecting Facing Material | Drawing | FIG. 22(B) | FIG. 15(B) | — | — |
| | | Light Reflecting Face H Of Unit Reflecting Material | Material | | ← | Black TPO | Aluminum Vapor Deposition |
| | | | Total Rate Of Reflection (%) | | ← | | 90 |
| | | Light Absorbing Face K Of Unit Reflecting Material | Material | | ← | | — |
| | | | Total Rate Of Reflection (%) | | ← | | — |
| | Reflecting Material Substrate | Resin Sheet | Material | TPO | ← | TPO | TPO |
| | | | Color | Black | ← | Black | Black |
| | | Injection | Material | — | — | — | — |
| | | | Color | — | — | — | — |
| Result | Window Reflection Properties | | | ← | NG | OK | NG |
| | Reflected Radiated Heat Performance (%) | | | 45 | 90 | 0 | 0 |
| | Instrument Panel/Dashboard Surface Temperature (° C.) | | | 80 | 60 | 100 | 80 |
| | Overall Evaluation | | | ○ | X | — | — |

FIG. 15(A) is a blown-up view of a unit reflecting material 20 of a first embodiment which applies this invention to an instrument panel/dashboard 64. FIG. 15(B) is a perspective view showing the arrangement of unit reflecting material 20. Incidentally, the x axis appended to FIG. 15(B) indicates the right-left direction of a vehicle and the y axis indicates the fore and aft direction.

As is shown in FIG. 15(A), the unit reflecting material 20 of this first embodiment has three light reflecting faces, H1, H2 and H3 as well as one light absorbing face K1. The surface 21, which has a concave cross-sectional profile of unit reflecting material 20, has a multi-angle configured profile. The depth d of surface 21, which has a concave cross-sectional profile, is 250 μm. Light reflecting faces H1, H2 and H3 are oriented relative to windshield 61 while light absorbing face K1 is oriented relative to the driver. The angles of inclination of light reflecting faces H1, H2 and H3 are set at angles whereby all of the sun's rays 51 which come in from windshield 61 are all reflected by light reflecting faces H1, H2 and H3 and return through windshield 61. The angle of inclination of light absorbing face K, θK, is set to a value larger than the southing angle in mid-summer (the angle between the earth's surface and the sun). That is so that the incoming rays of the sun 50 from windshield 61 will not strike light absorbing face K1 when a vehicle is parked facing the south. When the total rate of reflection of light reflecting faces H1, H2 and H3 is 100% all of the sun's rays 50 incoming from windshield 61 which strike reflecting facing material 10 disposed on instrument panel/dashboard 64 are reflected in the direction toward windshield 61 and exit through it.

As FIG. 15(B) shows, the length of individual units of reflecting material 20 in the right-left direction of the vehicle (x axis direction) is the same as the length of the instrument panel/dashboard 64 in the vehicle's right-left direction. These units of reflecting material 20 are arrayed in the vehicle's fore and aft direction (y axis direction) without any gaps.

Incidentally, for ease of explanation, the length of unit reflecting material 20 in the vehicle's fore and aft direction (y axis direction) is designated L1 (See FIG. 15(A)).

In the first embodiment, a sheet of black thermoplastic polyolefin resin (TPO) is used for the substrate of reflecting material 10 and an aggregate of unit reflecting material 20 with the previously noted configuration of FIG. 15(A), is formed on this resin sheet for interior surface material for vehicles 40. Light reflecting faces H1, H2 and H3 are formed by aluminum vapor deposition. The total rate of reflection of sun's rays 50 of light reflecting faces H1, H2 and H3 is 90%. Light absorbing face K1 is formed by exposing the black thermoplastic polyolefin resin (TPO) of the substrate. Light absorbing face K has some aluminum adhering partially after the aluminum vapor deposition of light reflecting faces H1, H2 and H3 and has a total reflection rate of the sun's rays of 5%.

Each unit reflecting material 20 is formed by metal mold press molding. That is to say, an aluminum vapor deposited film is formed over the entire surface of the sheet of black thermoplastic polyolefin resin (TPO) and by metal mold press molding the surface 21 which has a concave cross-sectional profile of unit reflecting material 20, is formed. At the same time light reflecting face H comprising an aluminum vapor deposited film is formed in one sector of surface 21, which has a concave cross-sectional profile and in another sector the aluminum vapor deposited film is exfoliated causing the black thermoplastic polyolefin resin (TPO) of the substrate to be exposed, forming light absorbing face K.

Angles $\theta 1$, $\theta 2$ and $\theta 3$ are as follows. The definition of these angles is as explained in FIG. 10 (A) and straight lines Lc, Ld, Le, NL and VL and angles $\theta 1$, $\theta 2$ and $\theta 3$ are not depicted in FIG. 15 (A). Windshield 61 angle of inclination $\theta 1$ is $\theta 1=30°$, at point Pa1 in the drawing on light reflecting face H1, angle $\theta 2=40°$ and angle $\theta 3=17°$. At point Pa2 in FIG. 15(A) on light reflecting face H2, angle $\theta 2=24°$ and angle $\theta 3=8°$. All fulfill the angle requirement that that $\theta 2 \geq$ angle $\theta 3$. Incidentally, angle $\theta 2$ and angle $\theta 3$ can change depending on their position on light reflecting faces H1, H2 and H3 and the previously noted values indicate values at representative positions on light reflecting faces H1, H2 and H3. In the following embodiments, angles $\theta 1$, angle $\theta 2$ and angle $\theta 3$ will have the same values.

The effect of the first embodiment is as shown in Table 1. The window reflection properties were "OK" (satisfactory). Thus, when the driver is looking forward the view outside the vehicle 68 is not reflected in the windshield 61. The reason was because the view outside the vehicle 68, which would be expected to be visible as a reflected image, is interrupted by light absorbing face K1.

The reflected radiated heat performance was 90%. This means that 90% of the energy of the sun's rays 50 coming in from windshield 61 was reflected in a direction toward windshield 61.

The surface temperature of the instrument panel/dashboard was 60° C. Compared to a comparative example, which used a flat single layer sheet made of black thermoplastic polyolefin resin (TPO), a significant reduction in temperature was achieved.

FIG. 16 is a blown-up view of a unit reflecting material 20 of a second embodiment which applies this invention to an instrument panel/dashboard.

As is shown in FIG. 16, similar to the first embodiment, the unit reflecting material 20 of this second embodiment has three light reflecting faces, H1, H2 and H3 as well as one light absorbing face K1. The surface 21, which has a concave cross-sectional profile of unit reflecting material 20, has a multi-angle configured profile. The depth d of surface 21, which has a concave cross-sectional profile, is 250 μm. Light reflecting faces H1, H2 and H3 are oriented relative to windshield 61 while light absorbing face K1 is oriented relative to the driver. The angle of inclination of light absorbing face K, $\theta$K, is set to a value larger than the southing angle in mid-summer (the angle between the earth's surface and the sun) for the previously noted reasons. The arrangement of the individual units of reflecting material 20 is the same as in the first embodiment. (See FIG. 15(B)).

The unit reflecting material 20 of the second embodiment, compared to the first embodiment, has a configuration which moves light reflecting face H1 slightly closer to windshield 61, that is to say, to light absorbing face K1. Because of this, the length of unit reflecting material 20 of this second embodiment in the fore and aft direction of the vehicle (y axis direction) becomes L2 and is shorter than the length L1 in the first embodiment (L2<L1). In the second embodiment, the rays of the sun 51 reflected in the sector between point H1A and H1B on light reflecting face H1, strike light absorbing face K1 and are absorbed by this light absorbing face K1. Thus, the energy of the sun's rays 51 reflected in this sector are absorbed by light absorbing face K1 and are not radiated to the exterior of the vehicle through windshield 61.

The materials and total rate of reflection of light reflecting faces H1, H2 and H3 and light absorbing face K1 of unit reflecting material 20 are the same as in the first embodiment and the substrate of the reflecting material is also the same as in the first embodiment.

Angles $\theta 1$, $\theta 2$ and $\theta 3$ in the second embodiment are as follows. Windshield 61 angle of inclination $\theta 1$ is $\theta 1=30°$, at point Pa in the drawing on light reflecting face H1, angle $\theta 2=24°$ and angle $\theta 3=8°$. This fulfills the angle requirement that that $\theta 2 \geq$ angle $\theta 3$.

The effect of the second embodiment is as shown in Table 1. The window reflection properties were "OK" (satisfactory). Thus, when the driver is looking forward the view outside the vehicle 68 is not reflected in the windshield 61. The reason is the same as in the first embodiment.

The reflected radiated heat performance was 85%. This means that 85% of the energy of the sun's rays 50 coming in from windshield 61 was reflected in a direction toward windshield 61 and that 5% was absorbed by light absorbing face The surface temperature of the instrument panel/dashboard was 62° C. The increased surface temperature of the instrument panel/dashboard, compared to that in the first embodiment, was due to the reduction of reflected radiated heat performance from 90% in the first embodiment to 85%.

FIG. 17 is a blown-up view of a unit reflecting material 20 of a third embodiment which applies this invention to an instrument panel/dashboard 64.

As is shown in FIG. 17, the unit reflecting material 20 of this third embodiment has two light reflecting faces, H1 and H3 as well as one light absorbing face K1. The surface 21, which has a concave cross-sectional profile of unit reflecting material 20, has a multi-angle configured profile. The depth d of surface 21, which has a concave cross-sectional profile, is 250 μm. Light reflecting faces H1 and H3 are oriented relative to windshield 61 while light absorbing face K1 is oriented relative to the driver. The angle of inclination of light absorbing face K, $\theta$K, is set to a value larger than the southing angle in mid-summer (the angle between the earth's surface and the sun) for the previously noted reasons.

The arrangement of the individual units of reflecting material 20 is the same as in the first embodiment (see FIG. 15(B)).

The unit reflecting material 20 of the third embodiment, compared to the second embodiment, has a configuration which moves light reflecting face H1 even closer to windshield 61, that is to say, to light absorbing face K1. Because of this, the length of unit reflecting material 20 of this third embodiment in the fore and aft direction of the vehicle (y axis direction) becomes L3 and is shorter than the length L2 of the second embodiment (L3<L2<L1). In the third embodiment, the rays of the sun 51 reflected in the sector between point H1A and H1B on light reflecting face H1, strike light absorbing face K1 and are absorbed by this light absorbing face K1. Thus, the energy of the sun's rays 51 reflected in this sector are absorbed by light absorbing face K1 and are not radiated to the exterior of the vehicle through windshield 61.

The materials and total rate of reflection of light reflecting faces H1 and H3 and light absorbing face K1 of unit reflecting material 20 are the same as in the first embodiment and the substrate of the reflecting material is also the same as in the first embodiment.

Angles $\theta 1$, $\theta 2$ and $\theta 3$ in the third embodiment are as follows. Windshield 61 angle of inclination $\theta 1$ is $\theta 1=30°$, at point Pa in the drawing on light reflecting face H1, angle $\theta 2=40°$ and angle $\theta 3=8°$. This fulfills the angle requirement that that $\theta 2 \geq$ angle $\theta 3$.

The effect of the third embodiment is as shown in Table 1. The window reflection properties were "OK" (satisfactory). Thus, when the driver is looking forward the view outside the vehicle 68 is not reflected in the windshield 61. The reason is the same as in the first embodiment.

The reflected radiated heat performance was 65%. This means that 65% of the energy of the sun's rays 50 coming in from windshield 61 was reflected in a direction toward windshield 61 and that 25% was absorbed by light absorbing face K1.

The surface temperature of the instrument panel/dashboard was 71° C. The increased surface temperature of the instrument panel/dashboard, compared to that in the first and second embodiments, was due to the reduction of reflected radiated heat performance to 65%.

FIG. 18 is a blown-up view of a unit reflecting material 20 of a fourth embodiment which applies this invention to an instrument panel/dashboard 64.

As is shown in FIG. 18, the unit reflecting material 20 of this third embodiment has one light reflecting face, H1 as well as one light absorbing face K1. The surface 21, which has a concave cross-sectional profile of unit reflecting material 20, has a multi-angle configured profile. The depth d of surface 21, which has a concave cross-sectional profile, is 250 μm. Light reflecting face H1 is oriented relative to windshield 61 while light absorbing face K1 is oriented relative to the driver. The angle of inclination of light absorbing face K, $\theta K$, is set to a value larger than the southing angle in mid-summer (the angle between the earth's surface and the sun) for the previously noted reasons. The arrangement of the individual units of reflecting material 20 is the same as in the first embodiment (see FIG. 15(B)).

The unit reflecting material 20 of the fourth embodiment, compared to the third embodiment, has a configuration which moves light reflecting face H1 even closer to windshield 61, that is to say, to light absorbing face K1. Because of this the length of unit reflecting material 20 of this fourth embodiment in the fore and aft direction of the vehicle (y axis direction) becomes L4 and is shorter than the length L3 of the third embodiment (L4<L3<L2<L1). In the fourth embodiment, the rays of the sun 51 reflected in the sector between point H1A and H1B on light reflecting face H1, strike light absorbing face K1 and are absorbed by this light absorbing face K1. Thus, the energy of the sun's rays 51 reflected in this sector are absorbed by light absorbing face K1 and are not radiated to the exterior of the vehicle through windshield 61.

The materials and total rate of reflection of light reflecting faces H1 and H3 and light absorbing face K1 of unit reflecting material 20 are the same as in the first embodiment and the substrate of the reflecting material is also the same as in the first embodiment.

Angles $\theta 1$, $\theta 2$ and $\theta 3$ in the fourth embodiment are as follows. Windshield 61 angle of inclination $\theta 1$ is $\theta 1=30°$, at point Pa in the drawing on light reflecting face H1, angle $\theta 2=40°$ and angle $\theta 3=25°$. This fulfills the angle requirement that that $\theta 2 \geq$ angle $\theta 3$.

The effect of the fourth embodiment is as shown in Table 1. The window reflection properties were "OK" (satisfactory). Thus, when the driver is looking forward the scene outside the vehicle 68 is not reflected in the windshield 61. The reason is the same as in the first embodiment.

The reflected radiated heat performance was 40%. This means that 40% of the energy of the sun's rays 50 coming in from windshield 61 was reflected in a direction toward windshield 61 and that 50% was absorbed by light absorbing face K1.

The surface temperature of the instrument panel/dashboard was 82° C. The increased surface temperature of the instrument panel/dashboard, compared to that in the first through the third embodiments, was due to the reduction of reflected radiated heat performance to 40%.

FIG. 19(A) is a blown-up view of a unit reflecting material of a fifth embodiment which applies this invention to an instrument panel/dashboard. FIG. 19(B) is a perspective view showing the arrangement of unit reflecting material.

As is shown in FIG. 19(A), the unit reflecting material 20 of this fifth embodiment has three light reflecting faces, H1, H2 and H3 as well as two light absorbing faces K1 and K2. The surface 21, which has a concave cross-sectional profile of unit reflecting material 20, is configured as an irregular polygonal since light absorbing face K2 is added. Light reflecting faces H1, H2 and H3 are oriented relative to windshield 61 while light absorbing faces K1 and K2 are oriented relative to the driver. The angle of inclination of light absorbing face K1, $\theta K$, is set to a value larger than the southing angle in mid-summer (the angle between the earth's surface and the sun) for the previously noted reasons.

As is shown in FIG. 19(B), the length, in the right-left direction of the vehicle (x axis direction) of individual units of reflecting material 20 is the same as the length, in the right-left direction of the instrument panel/dashboard 64. These units of reflecting material 20 are arrayed without gaps in the fore and aft direction (y axis direction) of the vehicle.

The unit reflecting material 20 of the fifth embodiment, compared to the first embodiment, has a configuration which extends light reflecting face H1 toward the driver and has added light absorbing face K2. Because of this, the length of unit reflecting material 20 of this fifth embodiment in the fore and aft direction of the vehicle (y axis direction) becomes L5 and is longer than the length L1 of the first embodiment (L1<L5). Furthermore, since light absorbing face K2 was added, the depth d of surface 21, which has a concave cross-sectional profile, is 330 μm, deeper than in the first embodiment. The fifth embodiment has been made so that the rays of the sun striking light absorbing face K2 are absorbed by this light absorbing face K2. Thus, the energy of the sun's rays 50 striking light absorbing face K2 is absorbed by light absorbing face K2 and is not radiated to the exterior of the vehicle through windshield 61.

The materials and total rate of reflection of light reflecting faces H1, H2 and H3 and light absorbing faces K1 and K2 of unit reflecting material 20 are the same as in the first embodiment and the substrate of the reflecting material is also the same as in the first embodiment.

Angles θ1, θ2 and θ3 in the fifth embodiment are as follows. Windshield 61 angle of inclination θ1 is θ1=30°, at point Pa in the drawing on light reflecting face H1, angle θ2=40° and angle θ3=16°. This fulfills the angle requirement that that θ2≧angle θ3. Incidentally as shown in FIG. 10(A), point Pb, on the upper end of light absorbing face K through which straight line Lc passes, is the upper tip of light absorbing face K2 of the fifth embodiment.

The effect of the fifth embodiment is as shown in Table 1. The window reflection properties were "OK" (satisfactory). Thus, when the driver is looking forward the view outside the vehicle 68 is not reflected in the windshield 61. The reason is the same as in the first embodiment.

The reflected radiated heat performance was 75%. This means that 75% of the energy of the sun's rays 50 coming in from windshield 61 was reflected in a direction toward windshield 61 and that 15% was absorbed by light absorbing face K2 as described above.

The surface temperature of the instrument panel/dashboard was 67° C. The increased surface temperature of the instrument panel/dashboard, compared to that in the first through the third embodiments, was due to the reduction of reflected radiated heat performance to 75%.

FIG. 20 is a blown-up view of a unit reflecting material of a sixth embodiment which applies this invention to an instrument panel/dashboard.

As is shown in FIG. 20, the unit reflecting material 20 of this sixth embodiment has one light reflecting face, H as well as one light absorbing face K. The surface 21, which has a concave cross-sectional profile of unit reflecting material 20, is configured as a curved face, which links the three light reflecting faces H1, H2 and H3 of the first embodiment with a smooth curve. The depth d of surface 21, which has a concave cross-sectional profile, is 250 μm. Light reflecting face H is oriented relative to windshield 61 while light absorbing face K is oriented relative to the driver. The angle of inclination of light absorbing face K, θK, is set to a value larger than the southing angle in mid-summer (the angle between the earth's surface and the sun) for the previously noted reasons.

The arrangement of the individual units of reflecting material 20 is the same as in the first embodiment (See FIG. 15(B)) and the length, in the right-left direction of the vehicle (x axis direction) of individual units of reflecting material 20 is the same as the length, in the right-left direction of the instrument panel/dashboard 64. These units of reflecting material 20 are arrayed without gaps in the fore and aft direction (y axis direction) of the vehicle.

In the sixth embodiment, the same as with the first embodiment, a sheet made of black thermoplastic polyolefin resin (TPO) is used for the substrate of reflecting material 10 and an aggregate of unit reflecting material 20 with the previously noted configuration of FIG. 20, is formed on this resin sheet for interior surface material for vehicles 40. Light reflecting face H is formed by aluminum vapor deposition.

The total rate of reflection of sun's rays 50 of light reflecting face H is 90%. Light absorbing face K1 is formed by exposing the black thermoplastic polyolefin resin (TPO) of the substrate. Light absorbing face K has some aluminum adhering partially after the aluminum vapor deposition of light reflecting face H and has a total reflection rate of the sun's rays of 5%.

Angles θ1, θ2 and θ3 in the sixth embodiment are as follows. Windshield 61 angle of inclination θ1 is θ1=30°, at point Pa in the drawing on light reflecting face H1, angle θ2=26° and angle θ3=12°. This fulfills the angle requirement that that θ2≧angle θ3.

The effect of the second embodiment is as shown in Table 1. The window reflection properties were "OK" (satisfactory). Thus, when the driver is looking forward the view outside the vehicle 68 is not reflected in the windshield 61. The reason is the same as in the first embodiment.

The reflected radiated heat performance was 90%. This means that 90% of the energy of the sun's rays 50 coming in from windshield 61 was reflected in a direction toward windshield 61.

The surface temperature of the instrument panel/dashboard was 60° C. It has the same effect as the first embodiment which was formed by the three planes of light reflecting faces H1, H2 and H3 despite the fact that light reflecting face H is formed as a curve.

FIG. 21(A) is a blown-up view of a unit reflecting material of a seventh embodiment which applies this invention to an instrument panel/dashboard. FIG. 21(B) is a perspective view showing the arrangement of unit reflecting material. Incidentally, the x axis appended to FIG. 21(B) indicates the right-left direction of a vehicle and the y axis indicates the fore and aft direction.

As is shown in FIG. 21(A), the unit reflecting material 20 of the seventh embodiment has light reflecting face H as well as light absorbing face K. Light reflecting face H of the seventh embodiment is configured as a curved face, which links the three light reflecting faces H1, H2 and H3 of the fifth embodiment (see FIGS. 19(A) and (B)) with a smooth curve, and the profile of surface 21, which has a concave cross-sectional profile of unit reflecting material 20, is a curve. Further, light absorbing face K in the seventh embodiment is configured as a curved face which links the two light absorbing faces, K1 and K2 of the fifth embodiment with a smooth curve. The depth d of surface 21, which has a concave cross-sectional profile, is 330 μm, the same as the fifth embodiment. Light reflecting face H is oriented relative to windshield 61 while light absorbing face K is oriented relative to the driver. The angle of inclination of light absorbing face K, θK, is set to a value larger than the southing angle in mid-summer (the angle between the earth's surface and the sun) for the previously noted reasons.

As shown in FIG. 21(B), the length, in the right-left direction of the vehicle (x axis direction) of individual units of reflecting material 20 is the same as the length, in the right-left direction of the instrument panel/dashboard 64. These units of reflecting material 20 are arrayed without gaps in the fore and aft direction (y axis direction) of the vehicle.

In the seventh embodiment, as with the sixth embodiment, a sheet made of black thermoplastic polyolefin resin (TPO) is used for the substrate of reflecting material 10 and an aggregate of unit reflecting material 20 with the previously noted configuration of FIG. 21(A), is formed on this resin sheet for interior surface material for vehicles 40. Light reflecting face H is formed by aluminum vapor deposition. The total rate of reflection of sun's rays 50 of light reflecting face H is 90%. Light absorbing face K1 is formed by exposing the black thermoplastic polyolefin resin (TPO) of the substrate. Light absorbing face K has some aluminum adhering partially after the aluminum vapor deposition of light reflecting face H and has a total reflection rate of the sun's rays of 5%.

The unit reflecting material 20 of the seventh embodiment, like the unit reflecting material 20 of the fifth embodiment was made so that the rays of the sun striking the top sector of light absorbing face K (corresponding to light absorbing face K2 of the fifth embodiment) are absorbed by the top sector of this light absorbing face K. Thus, the energy of the sun's rays 50 which strikes the upper sector of this light absorbing face K is absorbed by this upper sector of this light absorbing face K and is not radiated to the exterior of the vehicle through windshield 61.

Angles θ1, θ2 and θ3 in the seventh embodiment are as follows. Windshield 61 angle of inclination θ1 is θ1=30°, at point Pa in the drawing on light reflecting face H1, angle θ2=40° and angle θ3=21°. This fulfills the angle requirement that that θ2≧angle θ3.

The effect of the seventh embodiment is as shown in Table 1. The window reflection properties were "OK" (satisfactory). Thus, when the driver is looking forward the scene outside the vehicle 68 is not reflected in the windshield 61. The reason is the same as in the first embodiment.

The reflected radiated heat performance was 75%. This means that 75% of the energy of the sun's rays 50 coming in from windshield 61 was reflected in a direction toward windshield 61 and that 15% was absorbed by light absorbing face K2 as described above.

The surface temperature of the instrument panel/dashboard was 67° C. The same effect was obtained as with the fifth embodiment wherein both light reflecting faces H1, H2 and H3 and light absorbing faces K1 and K2 were formed by planes despite both light reflecting face H and light absorbing face K being formed in this embodiment from curves.

In the unit reflecting material 20 of the eighth embodiment, surface 21, which has a concave cross-sectional profile, has a depth d of 50 μm and the total rate of reflection of light absorbing face K1 is 15%. In all other respects it is the same as unit reflecting material 20 of the first embodiment.

That is to say, in the eighth embodiment, the same as with the first embodiment, a sheet made of black thermoplastic polyolefin resin (TPO) is used for the substrate of reflecting facing material 10 and an aggregate of unit reflecting material 20 with the previously noted configuration, is formed on this resin sheet for interior surface material for vehicles 40. Light reflecting faces H1, H2 and H3 are formed by aluminum vapor deposition. The total rate of reflection of sun's rays 50 of light reflecting faces H1, H2 and H3 is 90%. Light absorbing face K1 is formed by exposing the black thermoplastic polyolefin resin (TPO) of the substrate. Light absorbing face K1 has some aluminum adhering partially after the aluminum vapor deposition of light reflecting faces H1, H2 and H3 and has a total reflection rate of the sun's rays of 15%.

In the same way as in the first embodiment, the interior furnishing material for vehicles 40 of the eighth embodiment was formed by metal mold press molding a sheet made of vapor deposited aluminum thermoplastic olefin resin. Since surface 21, which has a concave cross-sectional profile of unit reflecting material 20, is not very deep at only 50 μm, aluminum deposited when vapor depositing aluminum on light absorbing face K1 partially remains so that the total rate of reflection of light absorbing face K1 is 15%.

The results of the eighth embodiment are shown in Table 2. The window reflection properties were "OK" (satisfactory). While the total reflection rate of light absorbing face K1 is 15%, this is not a level where window reflection is irritating and is satisfactory. Thus, when the driver is looking forward the view outside the vehicle 68 though reflected in the windshield 61 does not bother him or her.

The reflected radiated heat performance was 90%. This means that 90% of the energy of the sun's rays 50 coming in from windshield 61 was reflected in a direction toward windshield 61.

The surface temperature of the instrument panel/dashboard was 60° C. Though the depth of surface 21, which has a concave cross-sectional profile, is 50 μm and the total rate of reflection of light absorbing face K1 is 15%, this embodiment has the same effect as the first embodiment.

In the unit reflecting material 20 of the ninth embodiment, surface 21, which has a concave cross-sectional profile, has a depth d of 40 μm and the total rate of reflection of light absorbing face K1 is 20%. In all other respects it is the same as unit reflecting material 20 of the eighth embodiment.

That is to say, in the ninth embodiment, as with the eighth embodiment, a sheet made of black thermoplastic polyolefin resin (TPO) is used for the substrate of reflecting material 10 and an aggregate of unit reflecting material 20 with the previously noted configuration is formed on this resin sheet for interior surface material for vehicles 40. Light reflecting faces H1, H2 and H3 are formed by aluminum vapor deposition. The total rate of reflection of sun's rays 50 of light reflecting faces H1, H2 and H3 is 90%. Light absorbing face K1 is formed by exposing the black thermoplastic polyolefin resin (TPO) of the substrate. Light absorbing face K1 has some aluminum adhering partially after the aluminum vapor deposition of light reflecting faces H1, H2 and H3 and has a total reflection rate of the sun's rays of 20%.

In the same way as in the first embodiment, the interior furnishing material for vehicles 40 of the ninth embodiment was formed by metal mold press molding a sheet of vapor deposited aluminum thermoplastic olefin resin. Since surface 21, which has a concave cross-sectional profile of unit reflecting material 20, is not very deep at only 40 μm, aluminum deposited when vapor depositing aluminum on light absorbing face K1 partially remains so that the total rate of reflection of light absorbing face K1 is 20%.

As shown in Table 2, the window reflection was NG (unsatisfactory). That is to say, when the total rate of reflection of light absorbing face K1 becomes 20%, when the driver is looking forward the scene outside the vehicle 68 is reflected in the windshield 61 and is irritating.

The reflected radiated heat performance was 90%. This means that 90% of the energy of the sun's rays 50 coming in from windshield 61 was reflected in a direction toward windshield 61.

The surface temperature of the instrument panel/dashboard was 60° C. Though the depth of surface 21, which has a concave cross-sectional profile, is 40 μm and the total rate of reflection of light absorbing face K1 is 20%, this embodiment has the same effect as the first embodiment except for its window reflection properties.

In the unit reflecting material 20 of the tenth embodiment, surface 21, which has a concave cross-sectional profile, has a depth d of 1000 μm and the total rate of reflection of light reflecting face H1 is 34%. In all other respects it is the same as unit reflecting material 20 of the first embodiment.

In the tenth embodiment, as with the first embodiment, the unit reflecting material 20 was formed by metal mold press molding a sheet made of an aluminum vapor deposited thermoplastic polyolefin (TPO) resin. Since the depth d of surface 21, which has a concave cross-sectional profile was large, 1000 μm, it is difficult to uniformly retain the aluminum vapor deposited on light reflecting faces H1, H2 and H3 when metal mold press molding. Because of this, the distribution of aluminum on light reflecting faces H1, H2 and H3 is uneven and the total rate of reflection of light reflecting faces H1, H2 and H3 declined to 34%.

The effect of the tenth embodiment is as shown in Table 2. The window reflection properties were "OK" (satisfactory). Thus, when the driver is looking forward the view outside the vehicle 68 is not reflected in the windshield 61. The reason is the same as in the first embodiment.

The reflected radiated heat performance was 34%. This means that 34% of the energy of the sun's rays 50 coming in from windshield 61 was reflected in a direction toward windshield 61.

The surface temperature of the instrument panel/dashboard was 85° C. The increased surface temperature of the instrument panel/dashboard, compared to the first embodiment, was due to the reduction of reflected radiated heat performance to 34%.

In the unit reflecting material 20 of the eleventh embodiment, surface 21, which has a concave cross-sectional profile, has a depth d of 1200 μm and the total rate of reflection of light reflecting face H1 is 23%. In all other respects it is the same as unit reflecting material 20 of the first embodiment.

In the eleventh embodiment, as with the first embodiment, the unit reflecting material 20 was formed by metal mold press molding a sheet made of an aluminum vapor deposited thermoplastic polyolefin (TPO) resin. Since the depth d of surface 21, which has a concave cross-sectional profile, was large, 1200 μm, it is difficult to uniformly retain the aluminum vapor deposited on light reflecting faces H1, H2 and H3 when metal mold press molding. Because of this, the distribution of aluminum on light reflecting faces H1, H2 and H3 is uneven and the total rate of reflection of light reflecting faces H1, H2 and H3 declined to 23%.

The effect of the second embodiment is as shown in Table 2. The window reflection properties were "OK" (satisfactory). Thus, when the driver is looking forward the view outside the vehicle 68 is not reflected in the windshield 61. The reason is the same as in the first embodiment.

The reflected radiated heat performance was 23%. This means that 23% of the energy of the sun's rays 50 coming in from windshield 61 was reflected in a direction toward windshield 61.

The surface temperature of the instrument panel/dashboard was 90° C. The increased surface temperature of the instrument panel/dashboard, compared to the first embodiment, was due to the reduction of reflected radiated heat performance to 23%.

In the twelfth embodiment, an interior component made of an injection molded polypropylene resin was used for a substrate for reflecting material 10 and an aggregate of unit reflecting material 20 was formed on this interior component to make interior surface material for vehicles 40. In all other respects it is the same as unit reflecting material 20 of the first embodiment.

The effect of the twelfth embodiment is as shown in Table 2. The window reflection properties were "OK" (satisfactory). Thus, when the driver is looking forward the view outside the vehicle 68 is not reflected in the windshield 61. The reason is the same as in the first embodiment.

The reflected radiated heat performance was 90%. This means that 90% of the energy of the sun's rays 50 coming in from windshield 61 was reflected in a direction toward windshield 61.

The surface temperature of the instrument panel/dashboard was 60° C. The same effect as the first embodiment was obtained even though an aggregate of unit reflecting material 20 was formed directly on the interior furnishing components.

FIG. 22(A) is a blown-up view of a unit reflecting material of a thirteenth embodiment which applies this invention to an instrument panel/dashboard. FIG. 22(B) is a perspective view showing the arrangement of unit reflecting material.

As is shown in FIG. 22(A), similar to the first embodiment, the unit reflecting material 20 of the thirteenth embodiment has three light reflecting faces, H1, H2 and H3 as well as one light absorbing face K1. The surface 21, which has a concave cross-sectional profile of unit reflecting material 20, has a multi-angle configured profile. The depth d of surface 21, which has a concave cross-sectional profile, is 250 μm. Light reflecting faces H1, H2 and H3 are oriented relative to windshield 61 while light absorbing face K1 is oriented relative to the driver. The angle of inclination of light absorbing face K, θK, is set to a value larger than the southing angle in mid-summer.

As is shown in FIG. 22(B), in the thirteenth embodiment unit reflecting material 20 are arrayed in both the vehicle's right-left direction (x axis direction) and the vehicle's fore and aft direction (y axis direction) separated by gaps (s). In this respect, the thirteenth embodiment differs from the first embodiment.

In the thirteenth embodiment, using sheets of black thermoplastic polyolefin resin (TPO) are used for the substrate of reflecting material 10, and multiple unit reflecting material 20, in the previously noted configuration, are placed separated by gaps on these sheets of resin to form interior surface material for vehicles 40. Between each of the unit reflecting material 20, are adjacent areas of black thermoplastic polyolefin resin (TPO).

The effect of the thirteenth embodiment is as shown in Table 2. The window reflection properties were "OK" (satisfactory). Thus, when the driver is looking forward the view outside the vehicle 68 is not reflected in the windshield 61. The reason is the same as in the first embodiment.

The reflected radiated heat performance was 45%. The reflected radiated heat performance declined, compared to the first embodiment, because the percentage of the area of reflecting facing material 10 that light reflecting faces H occupied declined because gaps (s) were separating the units of reflecting material 20 of the thirteenth embodiment.

The surface temperature of the instrument panel/dashboard was 80° C. The increased surface temperature of the instrument panel/dashboard, compared to that in the first embodiment, was due to the reduction of reflected radiated heat performance to 45%.

FIG. 23 is a blown-up view of a unit reflecting material of a fourteenth embodiment which applies this invention to an instrument panel/dashboard.

As is shown in FIG. 23, similar to the first embodiment, the unit reflecting material 20 of this fourteenth embodiment has three light reflecting faces, H1, H2 and H3 as well as one light absorbing face K1. The surface 21, which has a concave cross-sectional profile of unit reflecting material 20, has a multi-angle configured profile. The depth d of surface 21, which has a concave cross-sectional profile, is 250 μm. Light reflecting faces H1, H2 and H3 are oriented relative to windshield 61 while light absorbing face K1 is oriented relative to the driver. The angle of inclination of light absorbing face K, θK, is set to a value larger than the southing angle in mid-summer (the angle between the earth's surface and the sun) for the previously noted reasons. The arrangement of the individual units of reflecting material 20 is the same as in the first embodiment (see FIG. 15(B)).

The unit reflecting material 20 of the fourteenth embodiment, like the fifth embodiment, has a configuration which extends light reflecting face H1 toward the driver. Because of this, the length of unit reflecting material 20 of this fifth embodiment in the fore and aft direction of the vehicle (y axis direction) becomes L5, the same as in the fifth embodiment. However, because light absorbing face K2 was not added, the depth d of surface 21, which has a concave cross-sectional profile, is 250 μm, less than the depth in the fifth embodiment. In the fourteenth embodiment, the height of light absorbing face K1 relative to the length of unit reflecting material 20 in the vehicle's fore and aft direction (y axis direction) is shorter and the view outside the vehicle 68, reflected by the sector between point H2A and point H2B on light reflecting face H2, is reflected on the inner surface of windshield 61 and can be visible to the driver.

After actually confirming it, as shown in Table 2, the window reflection was "NG" (unsatisfactory). The reflected radiated heat performance and the surface temperature of the instrument panel/dashboard 64 were the same as in the first embodiment.

FIRST COMPARATIVE EXAMPLE

In a first comparative example, a single flat sheet of a facing material frequently used in the past for instrument panel/dashboards 64 made of black thermoplastic polyolefin resin was used.

As Table 2 shows, window reflection properties were "OK" (satisfactory) but the surface temperature of the instrument panel/dashboard 64 exceeded 100° C. because it absorbed the heat of the rays of the sun 50 coming in from the windshield 61.

SECOND COMPARATIVE EXAMPLE

In the second comparative example, a smooth reflecting material 200 was disposed on upper panel of instrument panel/dashboard 64. As shown in FIGS. 14(A) through (C), the smooth reflecting material 200 attempted to prevent the upper panel of an instrument panel/dashboard 64 from getting hot by reflecting the rays of the sun 50 coming in from windshield 61.

A sheet of black thermoplastic polyolefin resin (TPO) was used for the substrate of smooth reflecting material 200 and a reflecting face was formed on this by aluminum vapor deposition on this resin sheet. The total rate of reflection of the rays of the sun 50 of the reflecting face was 90%.

As shown in Table 2, window reflection properties were "NG" (unsatisfactory). As FIG. 14 (B) shows, the view outside the vehicle 68 was reflected in windshield 61 by the smooth reflecting material and obstructed the forward field of vision.

The reflected radiant heat performance as 0%. This was because the rays of the sun 51 reflected by smooth reflecting material 200 were reflected in the direction of the interior of the vehicle heating the ceiling and seats. Due to this, the air and temperature in the vehicle got hot and the instrument panel/dashboard 64 temperature rose to 80° C.

Likewise, as FIG. 14(A) shows the rays of the sun 51 reflected by smooth reflecting material 200 got in the eyes 67 of the driver and the driver sensing a glare was also confirmed.

Overall Evaluation

An overall evaluation of each embodiment was performed. Although the disclosed embodiments reduced the surface temperature compared to comparative examples 1 and 2, embodiments in which window reflection properties were "NG" (unsatisfactory) received a negative overall evaluation (rated X on the Tables). That is because it is important for interior surface material for vehicles 40 not to obstruct the forward field of vision of the driver. Embodiments, which were "OK" (satisfactory) in terms of window reflection properties, and obtained a reduction in surface temperature of a instrument panel/dashboard 64 compared to comparative example 1 received a good overall evaluation (rated O in the Tables), and those embodiments, which obtained a reduction in surface temperature of an instrument panel/dashboard 64 even when compared to comparative example 2 received a superior overall evaluation (rated with two concentric circles ⊚).

Referring to embodiments 4, 10 and 13 which had an overall evaluation of good (rated O in the Tables), to obtain a reduction of instrument panel/dashboard 64 surface temperature compared to comparative example 2, it is considered necessary for the reflected heat performance of interior surface material for vehicles 40 to be greater than 45%. Because of this, it is considered necessary to increase the total rate of reflection of the sun's rays 50 of light reflecting face H to more than 45%. Considering the fact that absorption of the sun's rays 50 in light reflecting face H will always occur (A 100% total rate of reflection of a reflecting surface cannot be achieved) it is even better to consider that it is necessary that the total rate of reflection of the sun's rays 50 of light reflecting face H be made 50% or more.

Referring to embodiment 8, which had an overall evaluation of superior, and embodiment 9, which had a negative overall evaluation, to make them so that the reflection of the view outside the vehicle in the windshield is not irritating, it is considered necessary to make the total rate of reflection of light absorbing face K1 less than 20% and even more preferable to make it less than 15%.

Referring to embodiments 8 through 11, from the aspect of manufacturing interior surface material for vehicles 40, the depth d of surface 21, which has a concave cross-sectional profile of unit reflecting material 20, should be larger than 40 μm and no larger than 1200 μm, but even more preferable should be a depth d from 50 μm to 1000 μm. Referring to embodiments which had an overall evaluation of "superior," it is even more preferable that the depth d of surface 21, which has a concave cross-sectional profile of unit reflecting material 20, be between 50 μm and 330 μm. However, this invention does not exclude those cases in which the depth of the concave cross-sectional face of unit reflecting material 20 is outside the previously noted range.

While the present invention has been particularly shown and described with reference to the preferred mode as illustrated in the drawings, it will be understood by one skilled in the art that various changes in detail may be effected therein without departing from the spirit and scope of the invention as defined by the claims.

| | Explanation of symbols |
|---|---|
| 10 | reflecting material |
| 20 | unit reflecting material |
| 21 | surface which has a concave cross-sectional profile |
| 22 | substrate |
| 30 | transparent material |
| 31 | flat outermost layer |
| 40 | interior surface material for vehicle |
| 50 | rays of the sun |
| 51 | reflected rays of the sun |
| 61 | windshield |
| 62 | rear window |
| 63 | side window |
| 64 | instrument panel/dashboard |
| 65 | shelf behind back seat |
| 66 | door trim |
| 67 | driver's eyes |
| 68 | view outside vehicle |
| 70 | heat conducting material |
| 71 | heat dissipating/radiating fin (radiator) |
| 72 | heat pipe |
| H | light reflecting face |
| K | light absorbing face |
| Dh | one direction that the light reflecting surface faces |
| Dk | other direction that the light absorbing surface faces |
| d | depth of the surface which has a concave cross-sectional profile |
| s | gap |
| θ1 | windshield angle of inclination |
| θ2 | the angle of the normal line NL and vertical line VL of unit reflecting material that passes through Pa |
| θ3 | the angle of straight line Le and vertical line VL |
| Pa | point on light reflecting face |
| Pb | point on farthest end of light absorbing face |
| Lc | line connecting Pa and Pb |
| Ld | line having twice the angle of inclination of the angle of inclination of the windshield which in addition passes through Pa |
| Le | line having an angle of inclination intermediate between Lc and Ld which in addition passes through Pa |

What is claimed:

1. A reflecting surface material comprising:
multiple units of reflecting material each having a surface defined by a concave cross-sectional profile with at least one light reflecting face formed in one sector of the profile and at least one light absorbing face formed in another sector of the profile, wherein a plurality of said units of reflecting material being positioned such that said light reflecting faces are disposed in one direction and said light absorbing faces are disposed in another direction, at least one of said light reflecting faces and said light absorbing faces containing multiple planar faces having different angles of inclination.

2. The reflecting surface material of claim 1, wherein said multiple units of reflecting material are arrayed without gaps therebetween.

3. The reflecting surface material of claim 1, wherein said multiple units of reflecting material are arrayed separated by gaps.

4. The reflecting surface material of claim 1, wherein the total rate of reflection of the rays of the sun of said light reflecting faces is at least 50%.

5. The reflecting surface material of claim 1, wherein the total rate of reflection of the rays of the sun of said light absorbing faces is no more than 15%.

6. The reflecting surface material of claim 1, wherein the depth of said surface defined by said concave cross-sectional profile is between 50 μm and 1000 μm.

7. The reflecting surface material of claim 1, wherein said light reflecting face is one of a vapor deposited reflecting film, metallic plating film, and reflective paint film.

8. The reflecting surface material of claim 1, further comprising
a substrate on which said multiple units of reflecting material are formed, said substrate comprising one of a resin sheet and a molded resin substrate.

9. The reflecting surface material of claim 1, wherein said substrate is at least one material selected from the group consisting of vinyl chloride resin, thermoplastic olefin resin, acrylic resin, polypropylene resin and polyester resin.

10. The reflecting surface material of claim 1, further comprising
a flat outermost cover layer comprising a transparent material which transmits light.

11. The reflecting surface material of claim 10, wherein said transparent material comprises a resin that is applied by coating.

12. The reflecting surface material of claim 11, wherein said resin is at least one material selected from the group consisting of vinyl chloride resin, thermoplastic olefin resin, acrylic resin, polypropylene resin and polyester resin.

13. An interior surface material for a vehicle comprising the reflecting surface material of claim 1, wherein
the reflecting surface material is disposed in the vehicle such that said light reflecting faces are directed toward the exterior of the vehicle and said light absorbing faces are directed toward the interior of the vehicle.

14. The interior surface material of claim 13, wherein said light reflecting faces are directed toward the windshield of the vehicle and said light absorbing faces are directed toward the driver of the vehicle.

15. The interior surface material of claim 14, wherein a dimension in the width direction of said multiple units of reflecting material is equal to a dimension in the width direction of the instrument panel/dashboard of the vehicle.

16. The interior surface material of claim 14, wherein a dimension in the width direction of said multiple units of reflecting material is shorter than a dimension in the width direction of the instrument panel/dashboard of the vehicle, and a plurality of said multiple units are arrayed following the width direction of the vehicle.

17. The interior surface material of claim 13, further comprising
a thermal conducting material connected thermally to a radiator disposed outside the vehicle, said thermal conducting material being connected thermally to said reflecting surface material to radiate heat inside the vehicle to the outside.

18. A reflecting surface material comprising
multiple units of reflecting material each having a surface defined by a concave cross-sectional profile with at least one light reflecting face formed in one sector of the profile and at least one light absorbing face formed in another sector of the profile, wherein a plurality of said units of reflecting material being positioned such that said light reflecting faces are disposed in one direction and said light absorbing faces are disposed in another direction, at least one of said light reflecting faces and said light absorbing faces containing multiple curved faces having different radii of curvature.

* * * * *